(12) United States Patent
Kuwamura et al.

(10) Patent No.: US 10,591,314 B2
(45) Date of Patent: Mar. 17, 2020

(54) ROTATION SENSOR

(71) Applicant: Mitsubishi Electric Corporation, Tokyo (JP)

(72) Inventors: Tomoki Kuwamura, Tokyo (JP); Akira Takashima, Tokyo (JP); Hiroshi Fujita, Tokyo (JP); Akira Koshimizu, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 378 days.

(21) Appl. No.: 15/486,881

(22) Filed: Apr. 13, 2017

(65) Prior Publication Data

US 2018/0112999 A1 Apr. 26, 2018

(30) Foreign Application Priority Data

Oct. 26, 2016 (JP) ................................. 2016-209339

(51) Int. Cl.
*G01D 5/12* (2006.01)
*G01D 11/24* (2006.01)
*G01D 5/14* (2006.01)

(52) U.S. Cl.
CPC ............... *G01D 5/12* (2013.01); *G01D 5/145* (2013.01); *G01D 11/245* (2013.01)

(58) Field of Classification Search
CPC ............ G01D 5/12; G01D 5/14; G01D 5/142; G01D 5/145; G01D 5/147; G01D 11/24; G01D 11/245

See application file for complete search history.

(56) References Cited

FOREIGN PATENT DOCUMENTS

JP 2012002654 A * 1/2012 ............... G01D 5/12
JP 5865988 B1 2/2016

* cited by examiner

*Primary Examiner* — Son T Le
(74) *Attorney, Agent, or Firm* — Sughrue Mion, PLLC; Richard C. Turner

(57) ABSTRACT

To obtain a rotation sensor capable of reducing manufacturing cost, provided is a rotation sensor including: a case including: a bottom surface portion; a side surface portion; and an opening; a pair of lead frames each including a distal end inserted into the case through the opening; a magnetic detection section arranged inside the case, and configured to detect a change in magnetic field caused by a magnetic body; and a holder surrounding the magnetic detection section in cooperation with the case, the holder including: a holder main body, which has an outer peripheral surface formed along an inner peripheral surface of the side surface portion and is configured to sandwich the pair of lead frames between the outer peripheral surface and the side surface portion; and a rib formed along a forming portion of the lead frame so as to be brought into contact with the forming portion.

8 Claims, 23 Drawing Sheets

ROTATION SENSOR

BACKGROUND OF THE INVENTION

1. Field of the Invention

The present invention relates to a rotation sensor that is to be used in, for example, an engine or a transmission of an automobile, and is configured to detect rotation of a rotating body.

2. Description of the Related Art

Hitherto, there has been known a rotation sensor configured to detect rotation of a rotating body. The rotation sensor includes: a case including a bottom surface portion arranged at a distance from a surface of the rotating body, a side surface portion defining a hollow internal space in cooperation with the bottom surface portion, and an opening formed in a portion of the side surface portion opposite to the bottom surface portion so as to be spatially continuous with the internal space; a pair of lead frames each including a distal end inserted into the case through the opening of the case; a magnetic detection section arranged inside the case so as to extend over the distal end of each of the pair of lead frames, and configured to detect a change in magnetic field caused by a magnetic body arranged on the rotating body; a spacer arranged between the lead frames and the side surface portion of the case so as to be brought into abutment on an inner peripheral surface of the side surface portion of the case; an internal filling resin filled into the internal space of the case in order to fix the magnetic detection section to the case; and an exterior resin covering the opening of the case (see, for example, Japanese Patent No. 5865988).

However, in order to fix the magnetic detection section to the case, an expensive internal filling resin is filled into the internal space of the case. Thus, there is a problem in that manufacturing cost is high.

SUMMARY OF THE INVENTION

The present invention provides a rotation sensor capable of reducing manufacturing cost.

According to one embodiment of the present invention, there is provided a rotation sensor, which is configured to detect rotation of a rotating body, the rotation sensor including: a case including: a bottom surface portion arranged at a distance from a surface of the rotating body; a side surface portion defining a hollow internal space in cooperation with the bottom surface portion; and an opening formed in a portion of the side surface portion opposite to the bottom surface portion so as to be spatially continuous with the internal space; a pair of lead frames each including a distal end inserted into the case through the opening; a magnetic detection section arranged inside the case so as to extend over the distal end of each of the pair of lead frames, and configured to detect a change in magnetic field caused by a magnetic body arranged on the rotating body; and a holder arranged in the case to surround the magnetic detection section in cooperation with the case, the holder including: a holder main body, which has an outer peripheral surface formed along an inner peripheral surface of the side surface portion and is configured to sandwich the pair of lead frames between the outer peripheral surface and the side surface portion; and a rib formed along a forming portion of one of the pair of lead frames so as to be brought into contact with the forming portion.

The rotation sensor according to the present invention includes the holder surrounding the magnetic detection section in cooperation with the case. The holder includes the holder main body, which has the outer peripheral surface formed along the inner peripheral surface of the side surface portion of the case and is configured to sandwich the lead frames between the outer peripheral surface and the side surface portion, and the rib formed along the forming portion of one of the pair of lead frames so as to be brought into contact with the forming portion. Accordingly, without use of an expensive internal filling resin, the magnetic detection section can be fixed to the case. As a result, manufacturing cost can be reduced.

DESCRIPTION OF THE EMBODIMENTS

Figure 1:
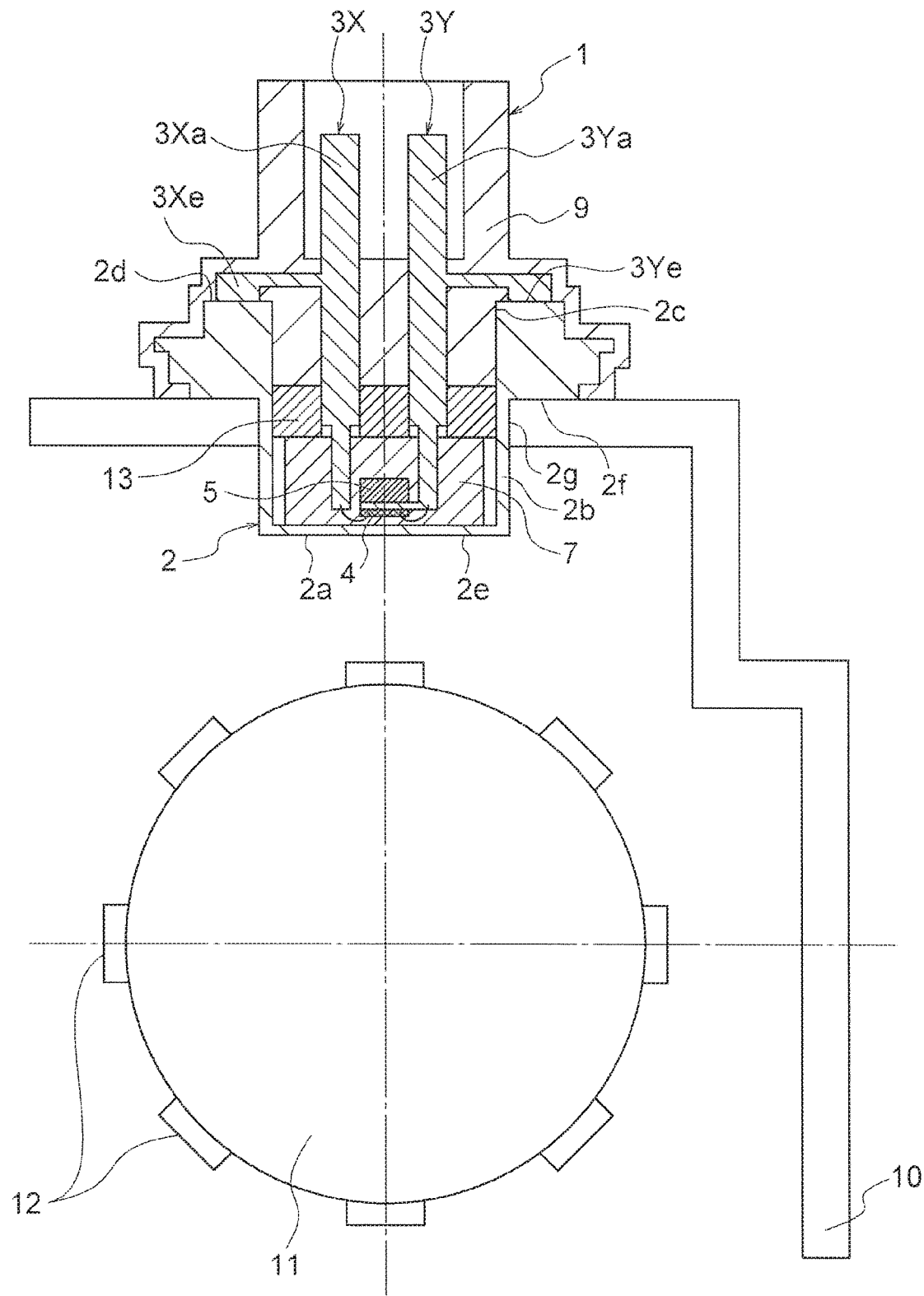
FIG. 1 is a sectional view for illustrating a rotation sensor according to a first embodiment of the present invention.

Now, embodiments of the present invention are described with reference to the drawings. Note that, in the drawings, the same reference symbols represent the same or corresponding parts.

First Embodiment

Figure 2:
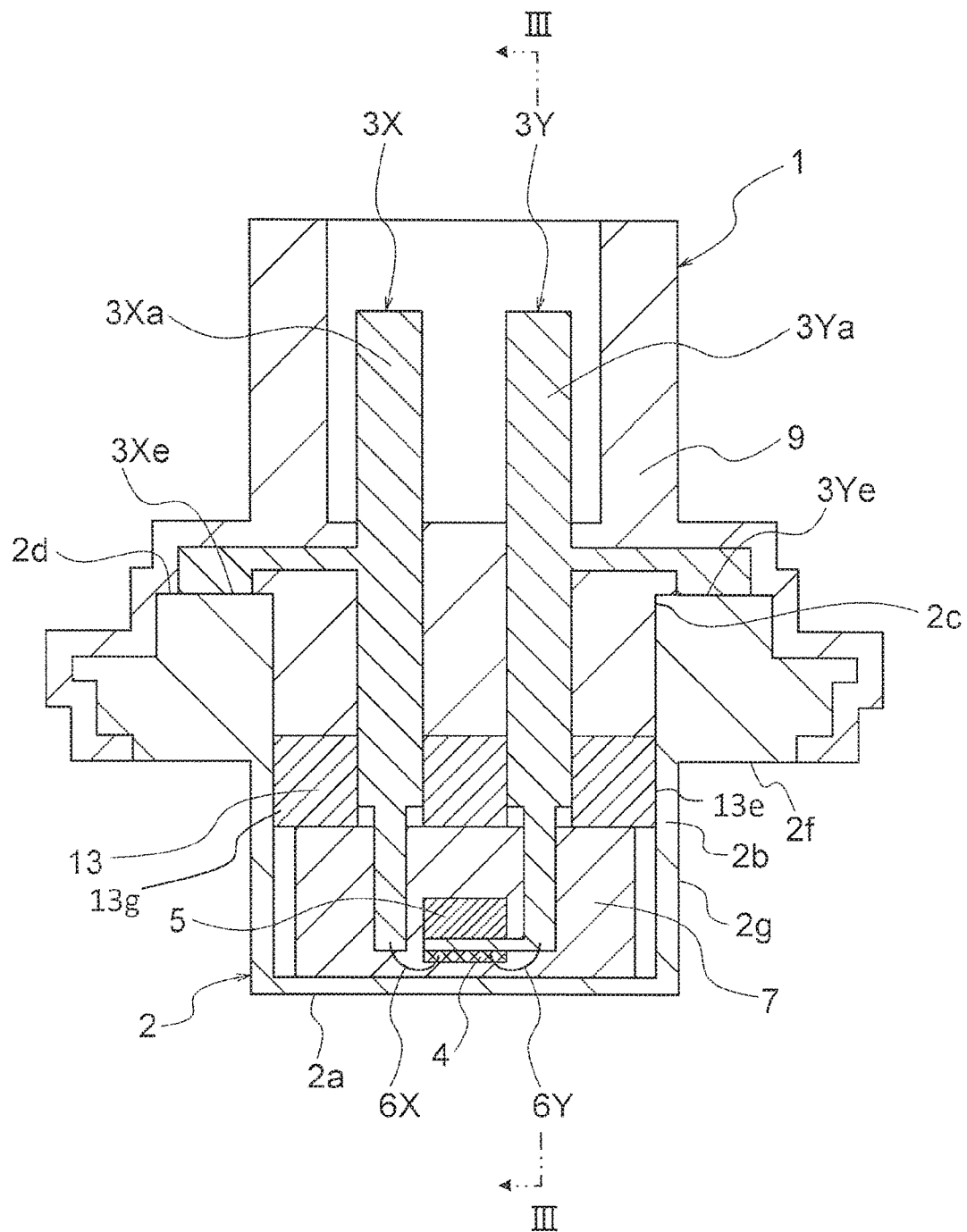
FIG. 2 is an enlarged view for illustrating relevant parts of the rotation sensor of FIG. 1.
Figure 3:
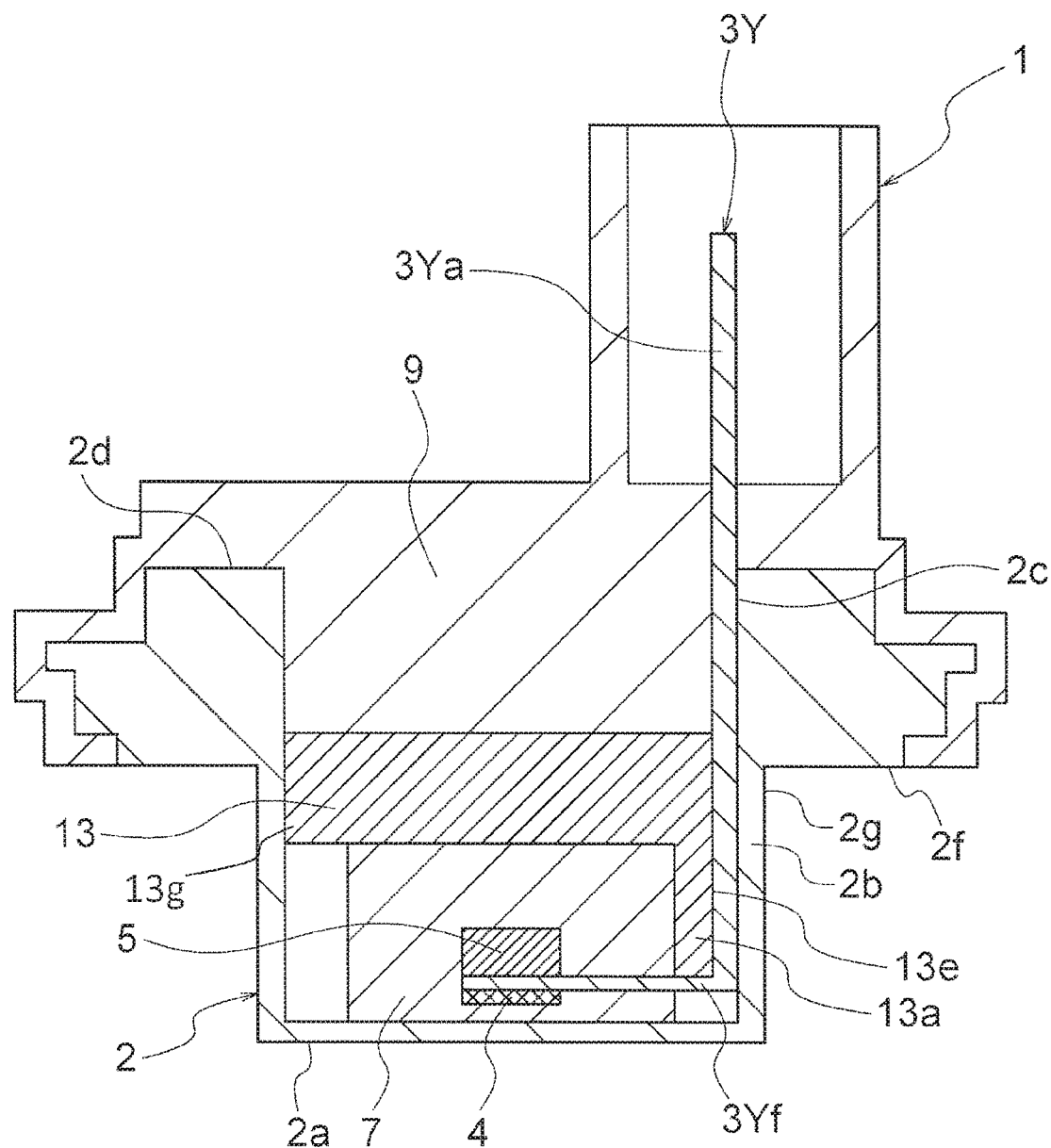
FIG. 3 is a sectional view taken along the line III-III of FIG. 2.

A rotation sensor according to a first embodiment of the present invention is to be used in, for example, an engine or a transmission of an automobile, and is configured to detect rotation of a rotating body. FIG. 1 is a sectional view for illustrating the rotation sensor according to the first embodiment of the present invention. FIG. 2 is an enlarged view for illustrating relevant parts of the rotation sensor of FIG. 1. FIG. 3 is a sectional view taken along the line III-III of FIG. 2. A rotation sensor 1 is inserted into an opening of a housing 10, and is mounted to the housing 10. In the housing 10, a rotary shaft 11 being the rotating body is accommodated. A joint shaft, which is connected to a crankshaft of an engine, or a crankshaft is exemplified as the rotary shaft 11. A plurality of convex portions 12 are arranged on an outer peripheral surface of the rotary shaft 11 at intervals along a circumferential direction of the rotary shaft 11. The convex portions 12 are made of, for example, a ferromagnetic material, e.g., iron. It is only necessary that the convex portions 12 be made of a magnetic material.

The rotation sensor 1 is configured to detect rotation of the rotary shaft 11. The rotation sensor 1 includes a case 2. The case 2 includes a bottom surface portion 2a arranged at a distance from a surface of the rotary shaft 11, and a side surface portion 2b defining a hollow internal space in cooperation with the bottom surface portion 2a. An opening 2c is formed in a portion of the side surface portion 2b opposite to the bottom surface portion 2a so as to be spatially continuous with the internal space. Further, the case 2 further includes an opening peripheral edge portion 2d formed on a radially outer side thereof with respect to the opening 2c. A distal end surface 2e is formed on a portion of the bottom surface portion 2a opposed to the rotary shaft 11. A flange portion 2f is formed in a portion of the opening peripheral edge portion 2d opposed to the housing 10. An outer peripheral surface of the side surface portion 2b forms a case outer peripheral surface 2g having a circular cross-section.

Further, the rotation sensor 1 further includes a pair of lead frames 3X and 3Y each including a distal end inserted into the case 2 through the opening 2c, a magnetic detection section 7 arranged inside the case 2 so as to extend over the distal end of each of the pair of lead frames 3X and 3Y, and configured to detect a change in magnetic field caused by the convex portions 12 arranged on the rotary shaft 11, a holder 13 arranged in the case 2 to surround the magnetic detection section 7 in cooperation with the case 2, and an exterior resin 9 covering the opening 2c of the case 2.

The magnetic detection section 7 includes an in-sensor magnet 5 and an integrated circuit (IC) 4. The IC 4 includes a detection element, e.g., a Hall element, and a signal processing circuit. The IC 4 generates a signal in accordance with the change in magnetic field of the in-sensor magnet 5 caused by movement of the plurality of convex portions 12 along with rotation of the rotary shaft 11.

The lead frame 3X and the magnetic detection section 7 are electrically connected to each other through a wire 6X. The lead frame 3Y and the magnetic detection section 7 are electrically connected to each other through a wire 6Y.

The lead frame 3X includes a terminal forming portion 3Xa, an IC connection portion (not shown) connected to the IC 4, a positioning portion 3Xe opposed to the opening peripheral edge portion 2d, and a forming portion 3Xf formed between the terminal forming portion 3Xa and the IC connection portion by bending the lead frame 3X. The forming portion 3Xf is bent at about 90 degrees.

Similar to the lead frame 3X, the lead frame 3Y includes a terminal forming portion 3Ya, an IC connection portion (not shown) connected to the IC 4, a positioning portion 3Ye opposed to the opening peripheral edge portion 2d, and a forming portion 3Yf formed between the terminal forming portion 3Ya and the IC connection portion by bending the lead frame 3Y. The forming portion 3Yf is bent at about 90 degrees.

The holder 13 includes an outer peripheral surface 13e formed along an inner peripheral surface of the side surface portion 2b, a holder main body 13g configured to sandwich the lead frame 3X and the lead frame 3Y between the outer peripheral surface 13e and the side surface portion 2b, and a rib 13a formed along the forming portion 3Yf of the lead frame 3Y so as to be brought into contact with the forming portion 3Yf. The outer peripheral surface 13e of the holder main body 13g is held in contact with the inner peripheral surface of the side surface portion 2b, the lead frame 3X, and the lead frame 3Y. The holder 13 fixes the magnetic detection section 7 to the case 2. The holder 13 serves as a lid configured to isolate, from the opening 2c, the magnetic detection section 7 arranged on the bottom surface portion 2a side in the internal space of the case 2.

Figure 4:
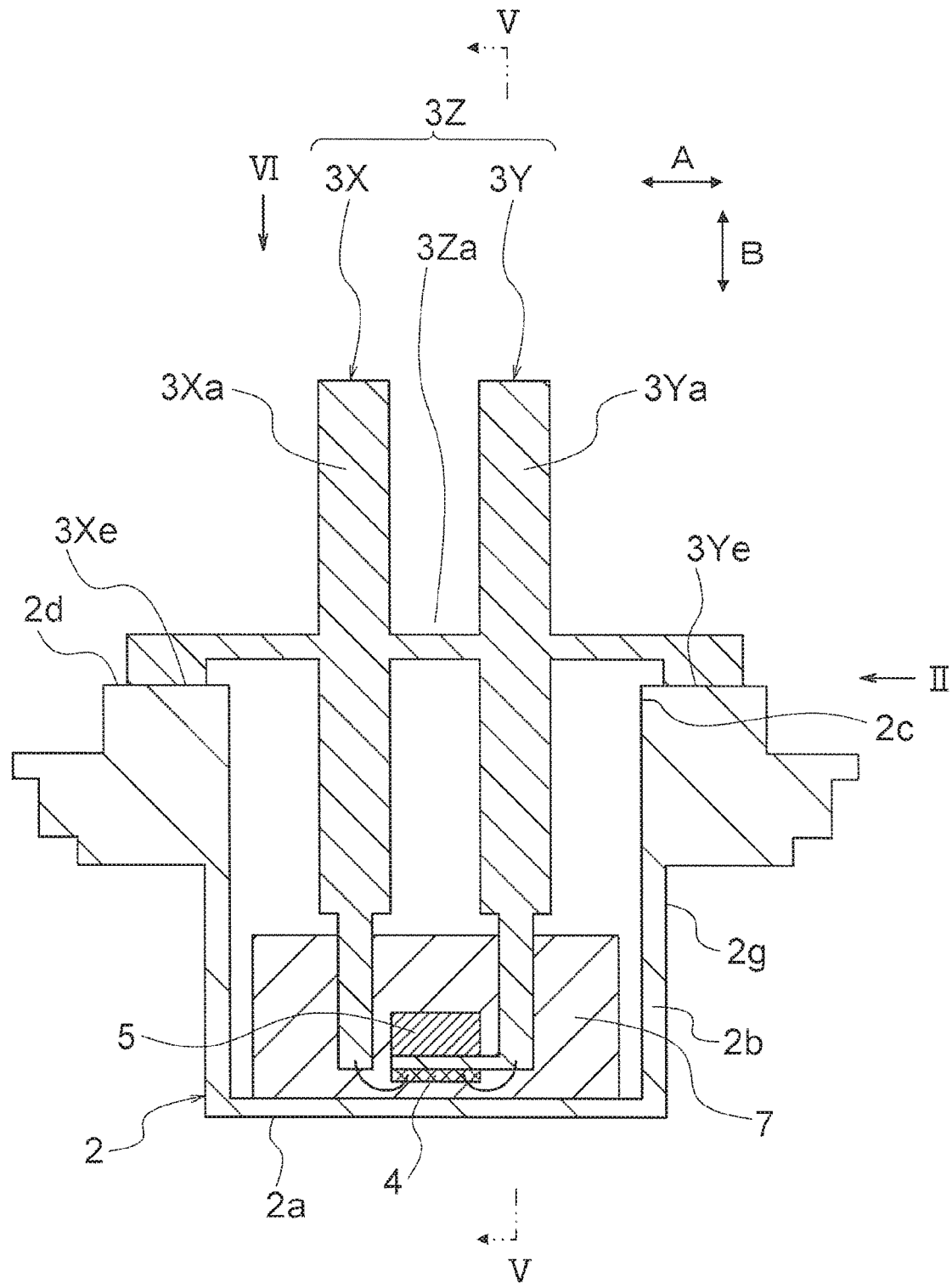
FIG. 4 is a view for illustrating a first step among steps of manufacturing the rotation sensor of FIG. 2.
Figure 5:
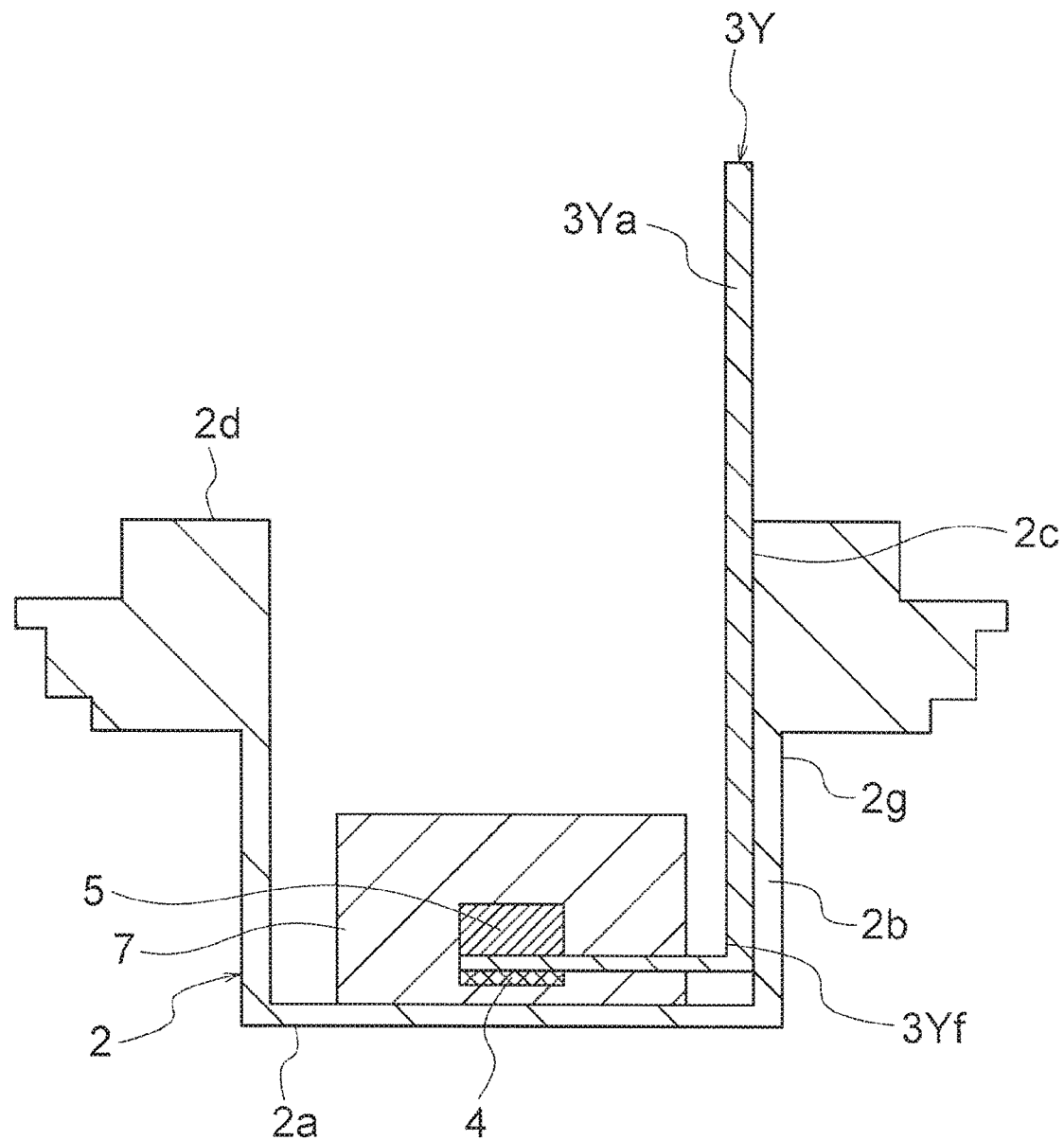
FIG. 5 is a sectional view taken along the line V-V of FIG. 4.
Figure 6:
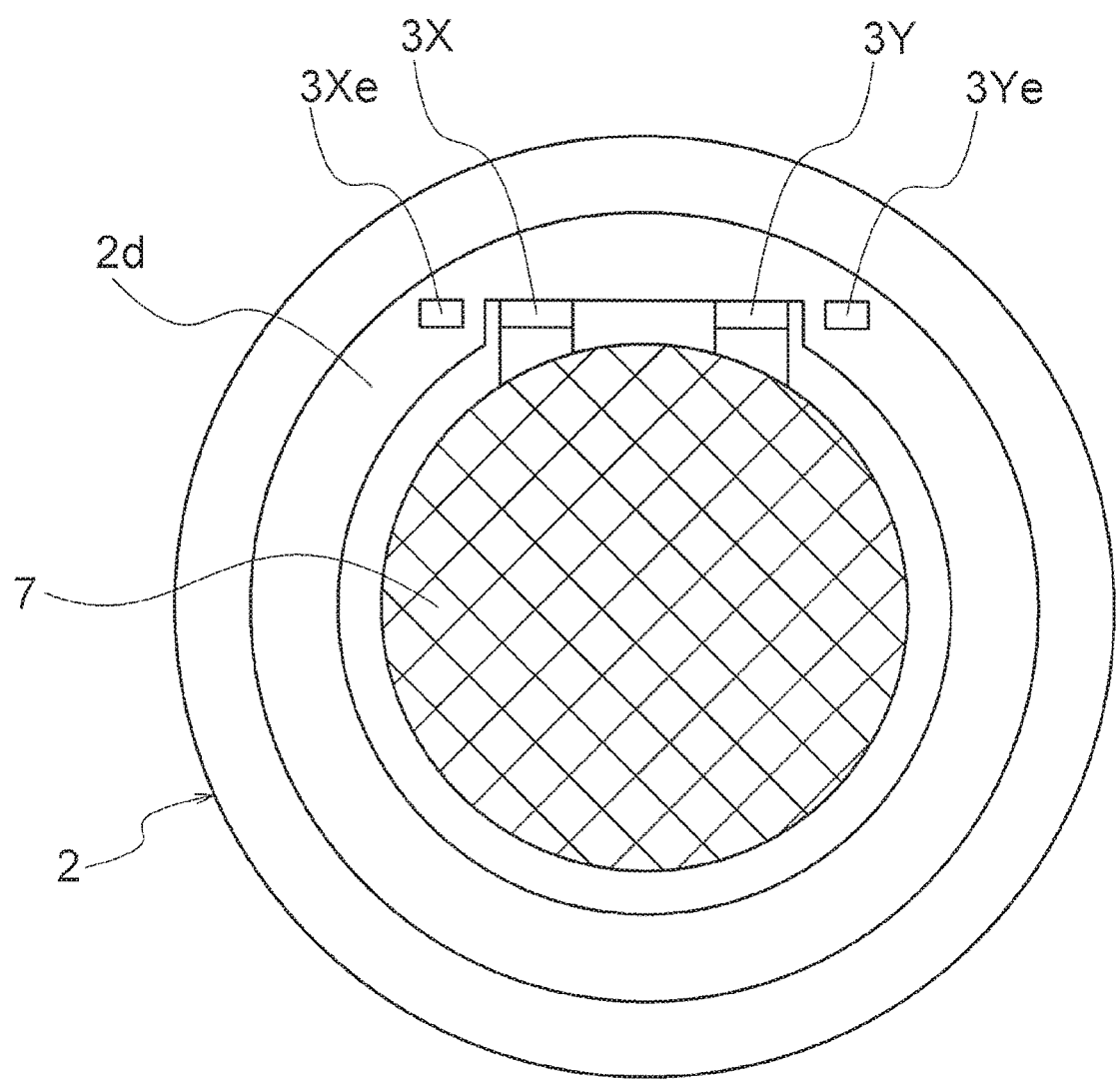
FIG. 6 is a view for illustrating the rotation sensor as viewed from a direction indicated by the arrow VI of FIG. 4.

Next, steps of manufacturing the rotation sensor 1 according to the first embodiment are described. FIG. 4 is a view for illustrating a first step among the steps of manufacturing the rotation sensor 1 of FIG. 2. FIG. 5 is a sectional view taken along the line V-V of FIG. 4. FIG. 6 is a view for illustrating the rotation sensor 1 as viewed from a direction indicated by the arrow VI of FIG. 4. In the first step among the steps of manufacturing the rotation sensor 1, a lead-frame coupled body 3Z and the magnetic detection section 7 are inserted into the internal space of the case 2 through the opening 2c of the case 2. The lead-frame coupled body 3Z includes the lead frame 3X, the lead frame 3Y, and a coupling portion 3Za configured to couple the lead frame 3X and the lead frame 3Y to each other. In the first step, the magnetic detection section 7 is accommodated inside the case 2.

On a portion of the case 2 located on an outer side with respect to the opening 2c in a width direction A of the internal space of the case 2, the opening peripheral edge portion 2d is formed to be directed in a depth direction B of the internal space of the case 2. In this case, the width direction A of the internal space of the case 2 corresponds to a direction indicated by the arrow A of FIG. 4. Further, the depth direction B of the internal space of the case 2 corresponds to a direction indicated by the arrow B of FIG. 4.

The positioning portion 3Xe and the positioning portion 3Ye are opposed to the opening peripheral edge portion 2d in the depth direction B. The positioning portion 3Xe and the positioning portion 3Ye are brought into abutment on the opening peripheral edge portion 2d, thereby positioning the lead-frame coupled body 3Z to the case 2.

Figure 7:
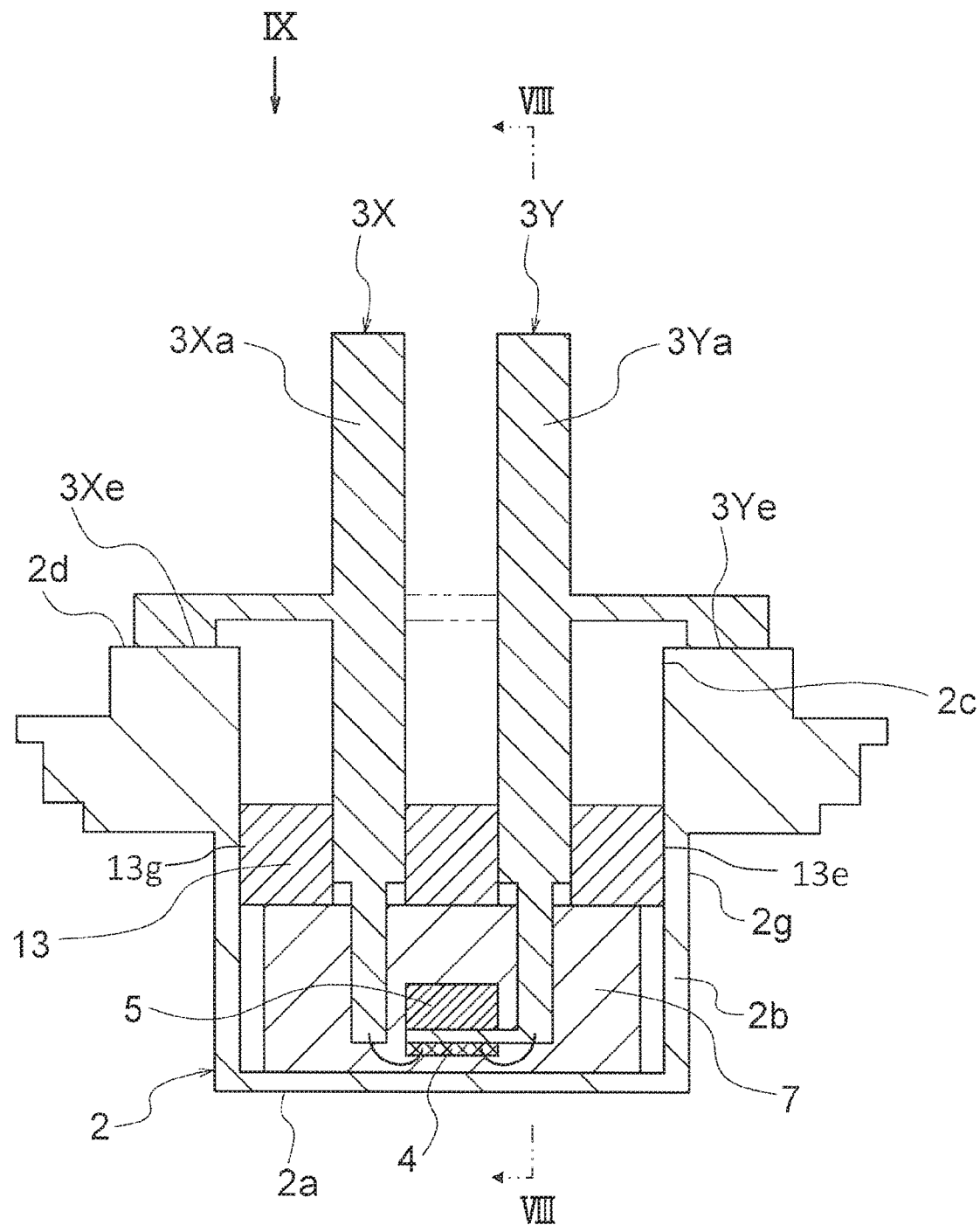
FIG. 7 is a view for illustrating a second step among the steps of manufacturing the rotation sensor of FIG. 2.
Figure 8:
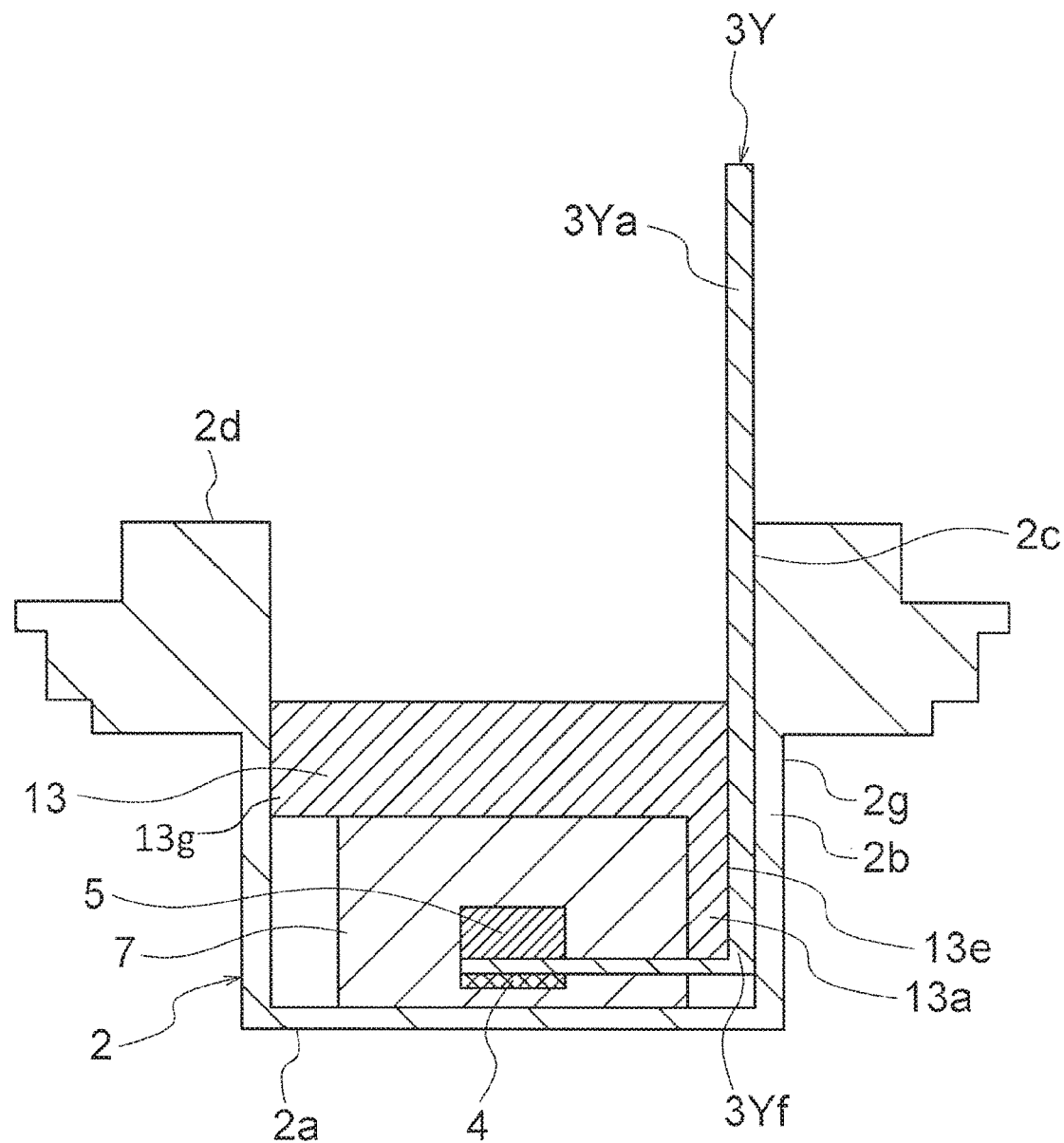
FIG. 8 is a sectional view taken along the line VIII-VIII of FIG. 7.
Figure 9:
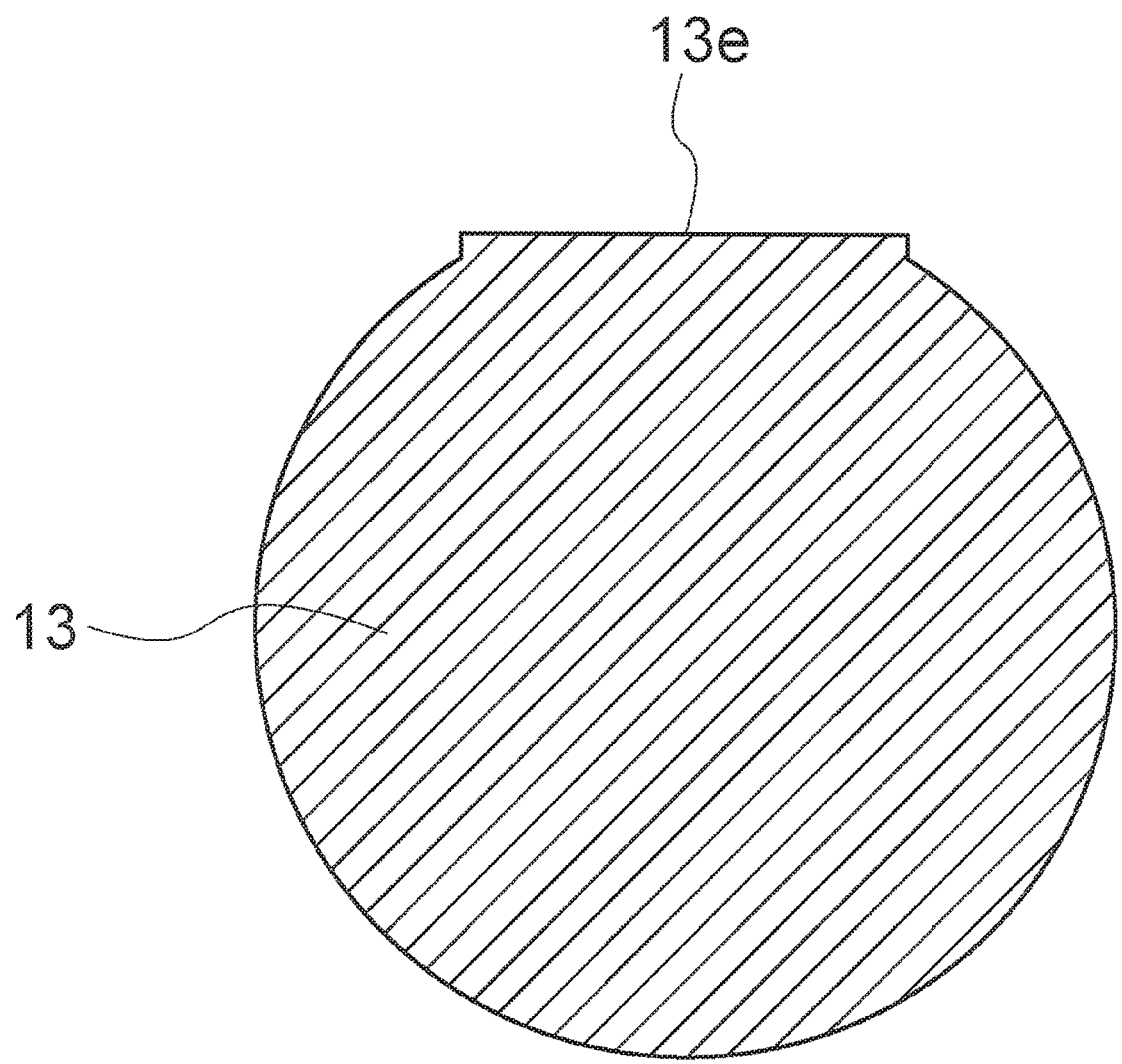
FIG. 9 is a view for illustrating a holder as viewed from a direction indicated by the arrow IX of FIG. 7.
Figure 10:
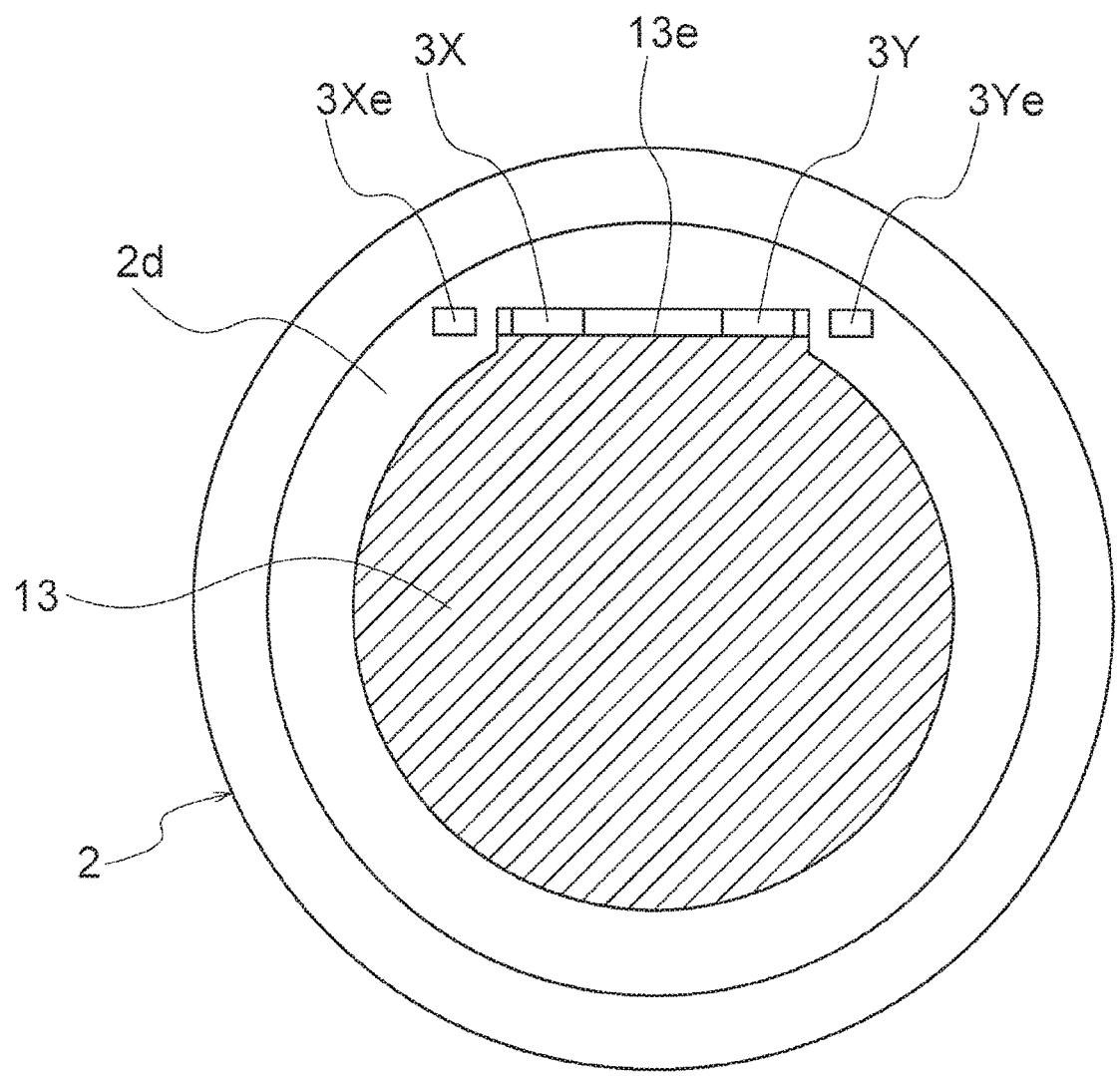
FIG. 10 is a view for illustrating the rotation sensor as viewed from a direction indicated by the arrow IX of FIG. 7.

FIG. 7 is a view for illustrating a second step among the steps of manufacturing the rotation sensor 1 of FIG. 2. FIG. 8 is a sectional view taken along the line VIII-VIII of FIG. 7. FIG. 9 is a view for illustrating the holder 13 as viewed from a direction indicated by the arrow IX of FIG. 7. FIG. 10 is a view for illustrating the rotation sensor 1 as viewed from a direction indicated by the arrow IX of FIG. 7. In the second step among the steps of manufacturing the rotation sensor 1, under a state in which the magnetic detection section 7 is accommodated inside the case 2, the holder 13 is inserted into the case 2 while the terminal forming portion 3Xa of the lead frame 3X and the positioning portion 3Xe of the lead frame 3X are fixed to the case 2 by manufacturing equipment or the like. The holder 13 is inserted into the case 2 so that the lead frame 3X and the lead frame 3Y are sandwiched between the outer peripheral surface 13e of the holder main body 13g and the side surface portion 2b of the case 2. In this manner, the magnetic detection section 7 is fixed to the case 2, and the magnetic detection section 7 arranged on the bottom surface portion 2a side in the internal space of the case 2 is isolated from the opening 2c. Further, the holder 13 is inserted into the case 2, thereby bringing the rib 13a of the holder 13 into contact with the forming portion 3Yf of the lead frame 3Y.

Further, in the second step, after the holder 13 is inserted into the case 2, the coupling portion 3Za is removed from the lead-frame coupled body 3Z. That is, the lead frame 3X and the lead frame 3Y of the lead-frame coupled body 3Z are separated from each other. The separated lead frames 3X and 3Y respectively construct the terminal forming portion 3Xa and the terminal forming portion 3Ya that establish electrical connection with exterior components.

Figure 11:
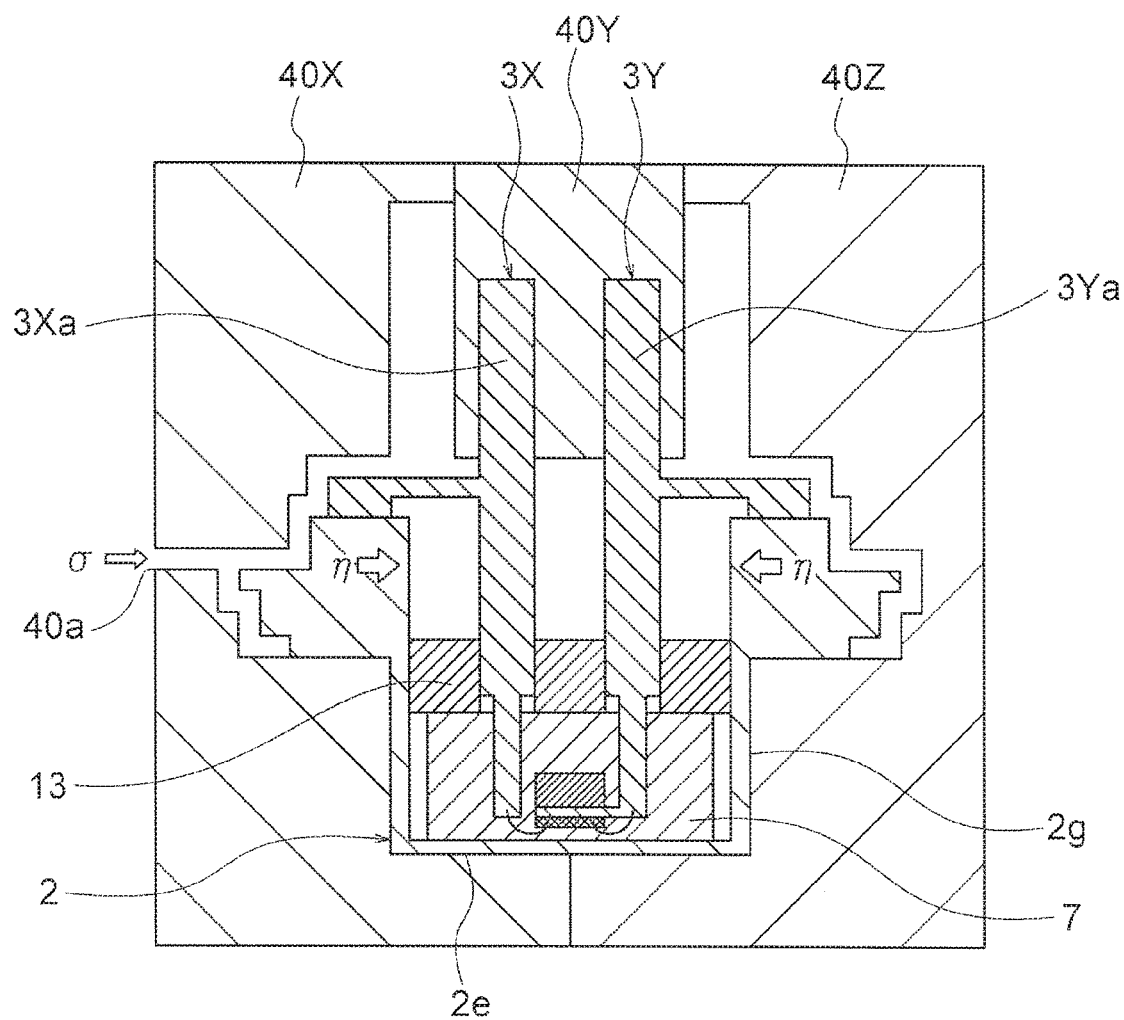
FIG. 11 is a view for illustrating a third step among the steps of manufacturing the rotation sensor of FIG. 2.

FIG. 11 is a view for illustrating a third step among the steps of manufacturing the rotation sensor 1 of FIG. 2. In the third step among the steps of manufacturing the rotation sensor 1, components in a state of assembling the holder 13 to the case 2 in the second step are set in a forming die 40X, a forming die 40Y, and a forming die 40Z for the exterior resin 9. The forming die 40X, the forming die 40Y, and the forming die 40Z are brought into contact with the case outer peripheral surface 2g and the distal end surface 2e. In this manner, the case 2 is fixed to the forming die 40X, the forming die 40Y, and the forming die 40Z. The forming die 40Y is brought into contact with the terminal forming portion 3Xa of the lead frame 3X and the terminal forming portion 3Ya of the lead frame 3Y. In this manner, the lead frame 3X and the lead frame 3Y are fixed to the forming die 40Y.

Further, in the third step, an exterior forming resin is injected in a direction indicated by the arrow σ from a gate 40a formed in the forming die 40X. In this manner, the exterior resin 9 is formed on the case 2. The exterior resin 9 includes a connector housing for external connection, a flange, and a sensor exterior portion.

As described above, the rotation sensor 1 according to the first embodiment of the present invention includes the holder 13 arranged in the case 2 to surround the magnetic detection section 7 in cooperation with the case 2. The holder 13 includes the holder main body 13g, which has the outer peripheral surface 13e formed along the inner peripheral surface of the side surface portion 2b and is configured to sandwich the lead frame 3X and the lead frame 3Y between the outer peripheral surface 13e and the side surface portion 2b. Accordingly, the holder 13 sandwiches the lead frame 3X and the lead frame 3Y in cooperation with the inner peripheral surface of the side surface portion 2b of the case 2, and isolates the magnetic detection section 7 on the bottom surface portion 2a of the case 2. Thus, without use of the expensive internal filling resin used for fixing the magnetic detection section 7 in the related-art rotation sensor, the magnetic detection section 7 can be fixed to an inside of the case 2. As a result, the steps of manufacturing the rotation sensor 1 can be simplified, and manufacturing cost for the rotation sensor 1 can be reduced.

Further, the holder 13 includes the rib 13a formed along the forming portion 3Yf of the lead frame 3Y so as to be brought into contact with the forming portion 3Yf. Accordingly, the rib 13a is brought into contact with the forming portion 3Yf, and the outer peripheral surface 13e is brought into contact with the lead frames 3X and 3Y. Thus, in the steps of manufacturing the rotation sensor 1, the lead frame 3X and the lead frame 3Y can be prevented from radially deforming inside the case 2. As a result, workability can be enhanced.

Further, the holder 13 is inserted into the case 2, thereby increasing rigidity of the case 2. Accordingly, as illustrated in FIG. 11, deformation in a η direction due to pressure of filling the exterior forming resin can be prevented. As a result, a step of checking and inspecting an appearance of the case 2 can be omitted.

Second Embodiment

Figure 12:
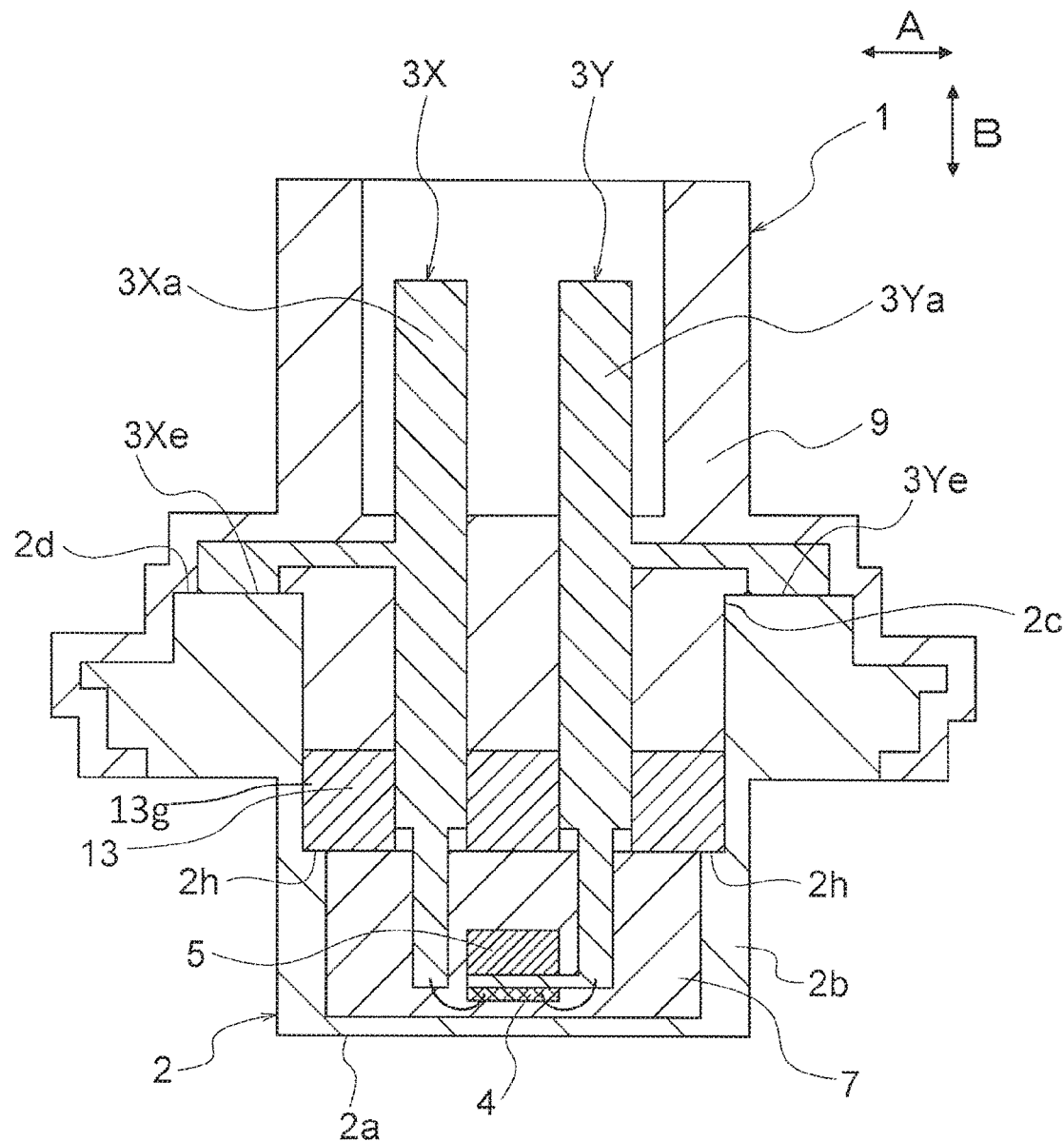
FIG. 12 is a sectional view for illustrating a rotation sensor according to a second embodiment of the present invention.

FIG. 12 is a sectional view for illustrating a rotation sensor according to a second embodiment of the present invention. The case 2 includes an abutment surface 2h to be brought into abutment on the holder 13 in the depth direction B of the case 2. A surface of the holder 13 to be brought into abutment on the abutment surface 2h is referred to as a holder lower surface. The abutment surface 2h is arranged to be flush with a surface of the magnetic detection section 7 that is to be brought into abutment on the holder 13 in the depth direction B of the case 2. The surface of the magnetic detection section 7 to be brought into abutment on the holder 13 in the depth direction B of the case 2 is referred to as a magnetic detection section upper surface. The other components are the same as those of the first embodiment.

As described above, according to the rotation sensor 1 of the second embodiment of the present invention, the case 2 includes the abutment surface 2h to be brought into abutment on the holder 13 in the depth direction B of the case 2, and the abutment surface 2h is arranged to be flush with the surface of the magnetic detection section 7 that is to be brought into abutment on the holder 13 in the depth direction B. Accordingly, the abutment surface 2h is brought into abutment on the holder lower surface, thereby being capable of reducing stress applied to the magnetic detection section 7 due to the pressure of filling the exterior forming resin. When stress is applied to the magnetic detection section 7, the exterior resin, e.g., an epoxy resin, which forms the magnetic detection section 7, may be cracked. There is an undeniable fear in that an influence may be exerted on a magnetic detection component, e.g., the IC 4, which is contained in the exterior resin. As the influence exerted on the IC 4 or the like, damage caused by stress, e.g., a microcrack, is exemplified. Therefore, in the rotation sensor 1 according to the second embodiment, the abutment surface 2h can reduce stress applied to the magnetic detection section 7. Accordingly, the manufacturing process can be stabilized, and quality can be stabilized.

Third Embodiment

Figure 13:
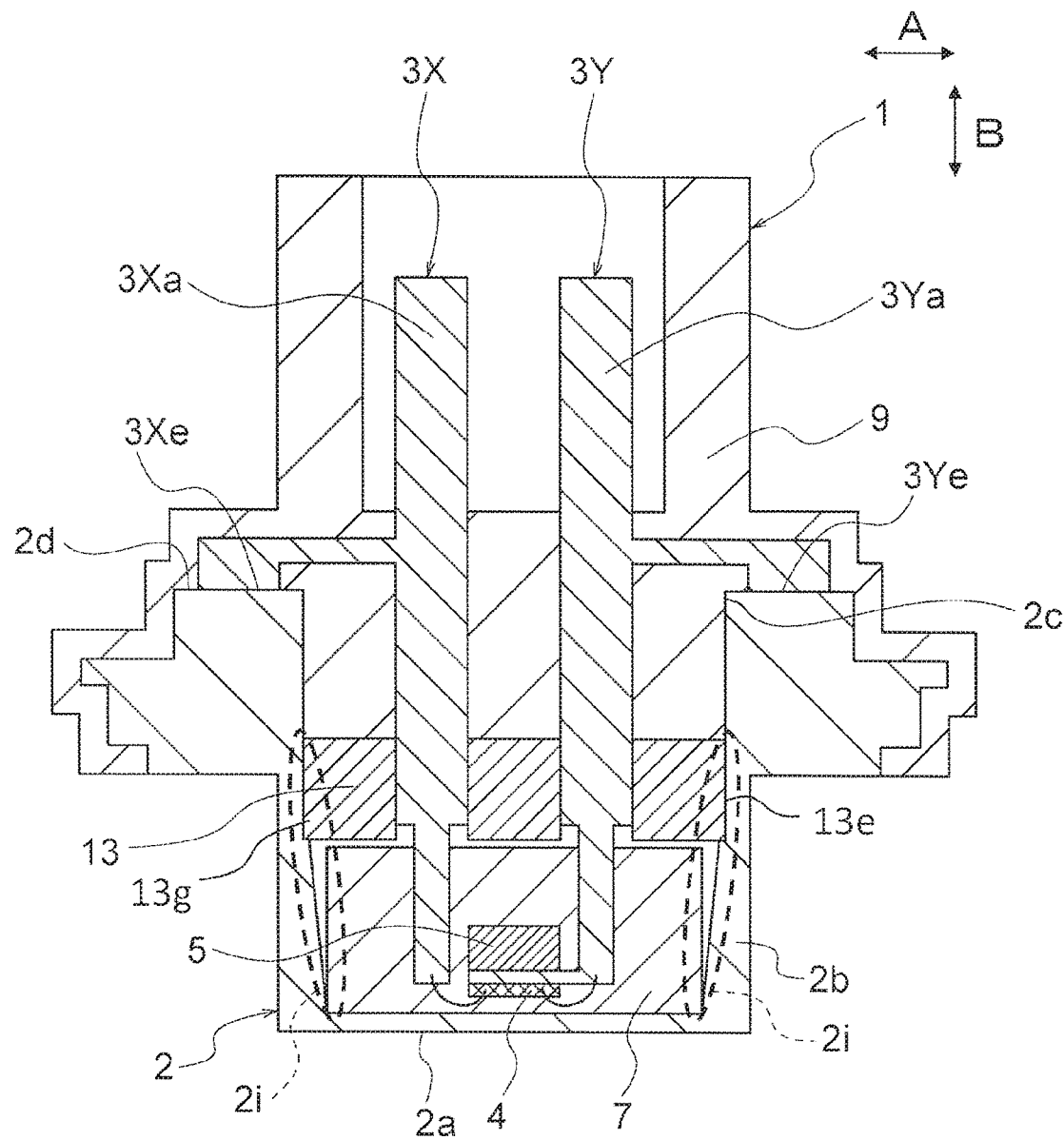
FIG. 13 is a sectional view for illustrating a rotation sensor according to a third embodiment of the present invention.

FIG. 13 is a sectional view for illustrating a rotation sensor according to a third embodiment of the present invention. The case 2 includes an inclined surface 2i formed so that a dimension of the internal space of the case 2 in the width direction A decreases as approaching to the bottom surface portion 2a in the depth direction B of the case 2. The inclined surface 2i is formed from the bottom surface portion 2a to the vicinity of the magnetic detection section upper surface of the magnetic detection section 7 in the inside of the case 2. In the vicinity of the magnetic detection section upper surface, an inner diameter of the case 2 is smaller than an outer diameter of the holder 13. At least a part of the outer peripheral surface 13e of the holder 13 is brought into abutment on the inclined surface 2i. The other components are the same as those of the first embodiment.

As described above, according to the rotation sensor 1 of the third embodiment of the present invention, the case 2 includes the inclined surface 2i formed so that the dimension of the internal space in the width direction A decreases as approaching to the bottom surface portion 2a in the depth direction B of the case 2, and at least a part of the outer peripheral surface 13e of the holder 13 is brought into abutment on the inclined surface 2i. Accordingly, the holder 13 is press-fitted into the case 2, thereby being capable of preventing the holder 13 from slipping off. Further, the holder 13 is press-fitted into the case 2, thereby being capable of preventing the magnetic detection section 7 from slipping off from the case 2 due to handling in the manufacturing steps. Therefore, simplification of the manufacturing steps can be enhanced, and workability during the manufacturing steps can be enhanced. Further, as compared to the first embodiment, the holder 13 is more closely fitted to the inner peripheral surface of the case 2. Accordingly, deformation in the η direction due to the pressure of filling the exterior forming resin can be prevented. As a result, a step of checking and inspecting an appearance of the case 2 can be omitted.

Fourth Embodiment

Figure 14:
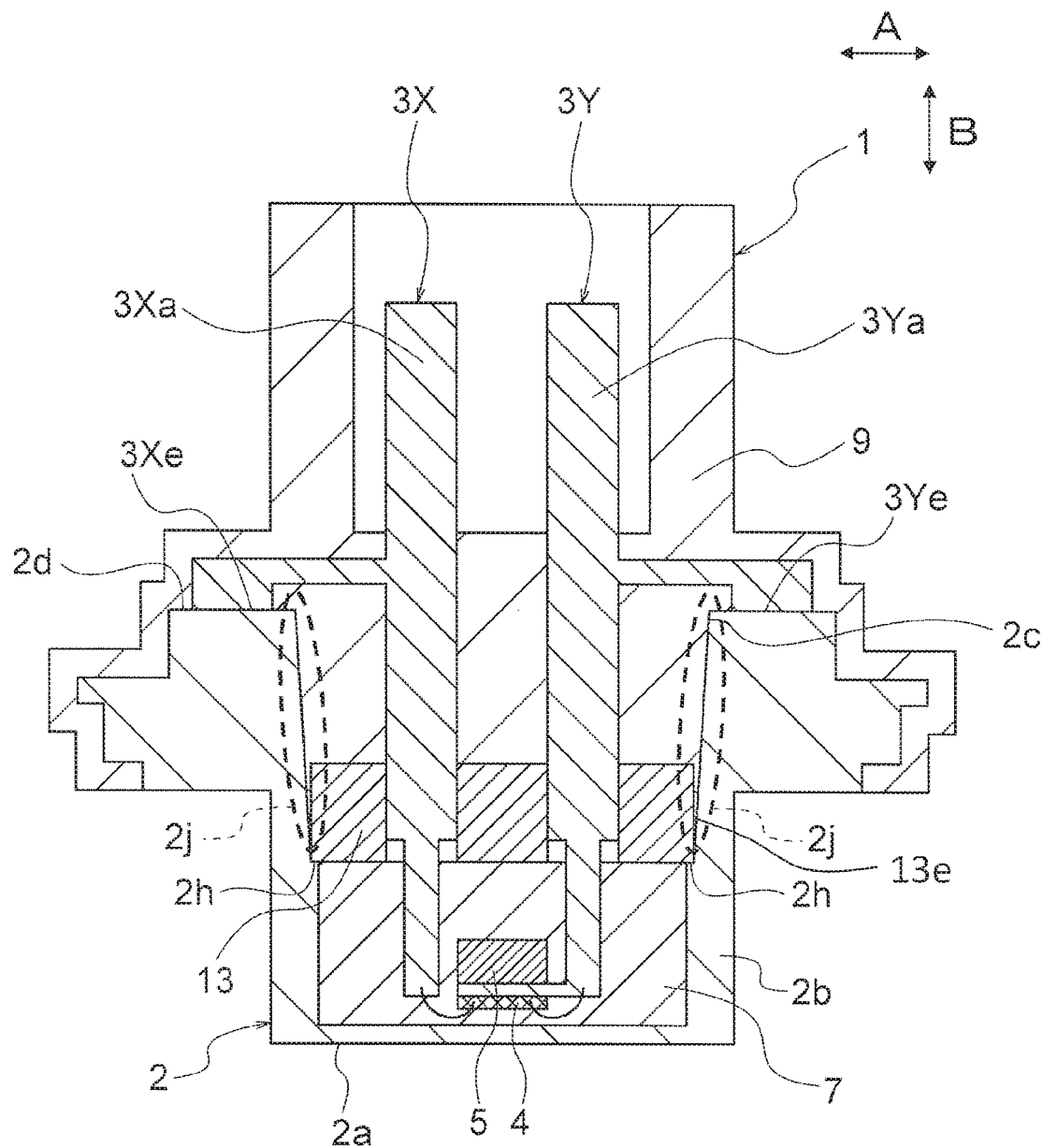
FIG. 14 is a sectional view for illustrating a rotation sensor according to a fourth embodiment of the present invention.
Figure 15:
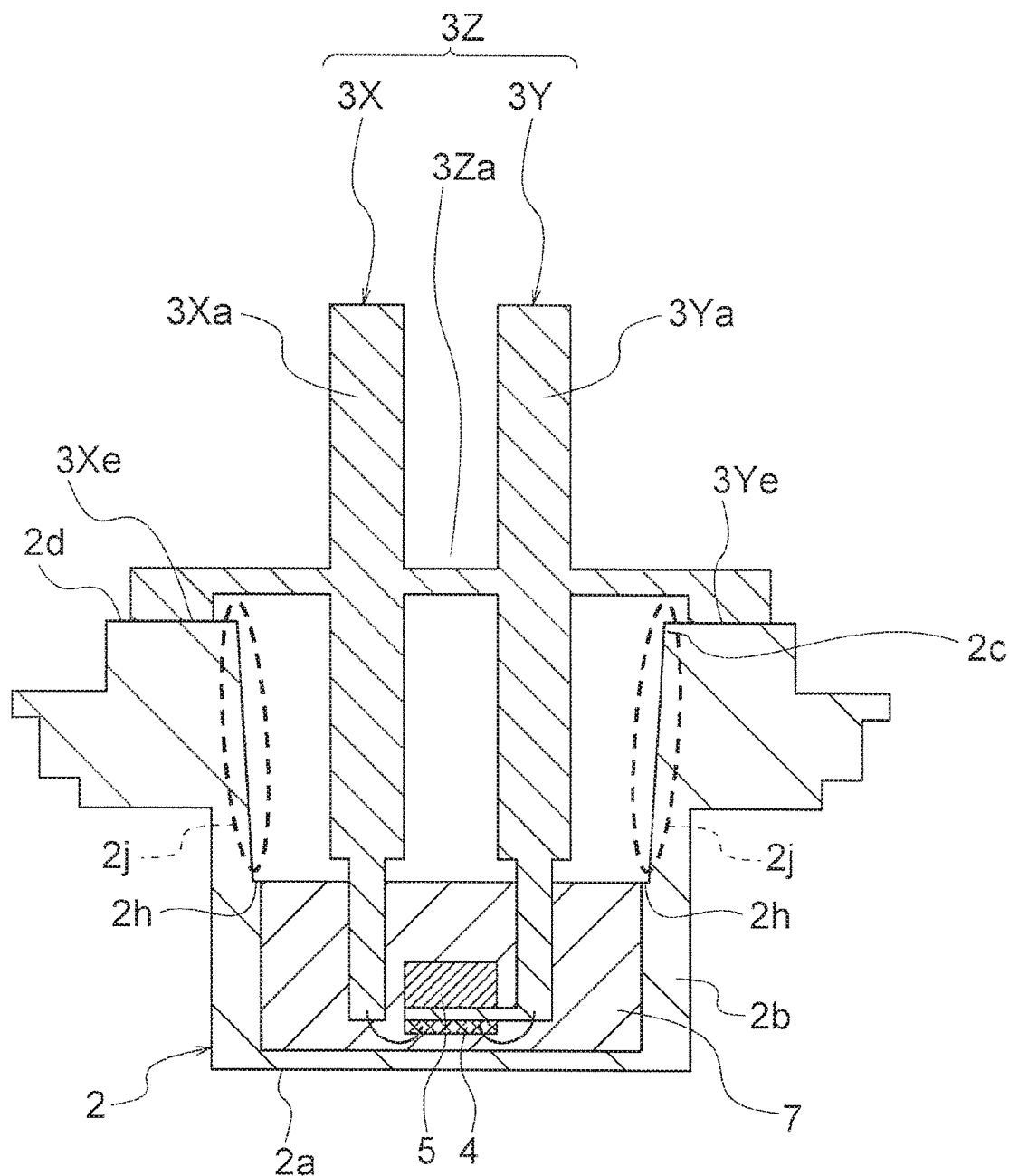
FIG. 15 is a view for illustrating a first step among steps of manufacturing the rotation sensor of FIG. 14.
Figure 16:
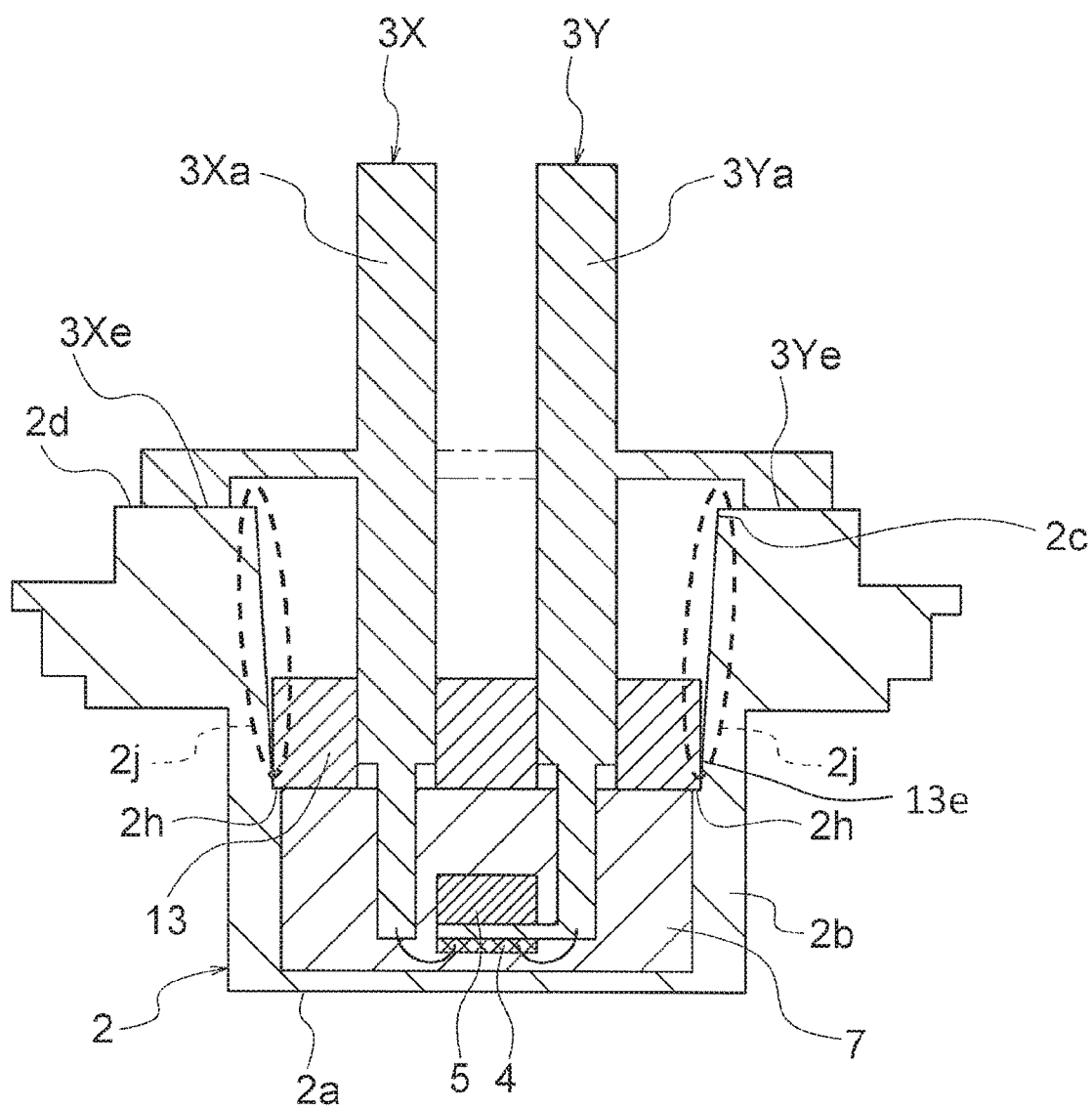
FIG. 16 is a view for illustrating a second step among the steps of manufacturing the rotation sensor of FIG. 14.

FIG. 14 is a sectional view for illustrating a rotation sensor according to a fourth embodiment of the present invention. FIG. 15 is a view for illustrating a first step among steps of manufacturing the rotation sensor of FIG. 14. FIG. 16 is a view for illustrating a second step among the steps of manufacturing the rotation sensor of FIG. 14. The case 2 includes the abutment surface 2h to be brought into abutment on the holder 13 in the depth direction B of the case 2. The surface of the holder 13 to be brought into abutment on the abutment surface 2h is referred to as the holder lower surface. The abutment surface 2h is arranged to be flush with the surface of the magnetic detection section 7 that is to be brought into abutment on the holder 13 in the depth direction B.

In a portion of the case 2 closer to the opening 2c than the abutment surface 2h, an inclined surface 2j is formed so that a dimension of the internal space in the width direction A decreases as approaching to the bottom surface portion 2a in the depth direction B of the case 2. In other words, the inclined surface 2j is formed so that an inner diameter of the case 2 decreases as approaching from the opening 2c to the abutment surface 2h. At least a part of the outer peripheral surface 13e of the holder 13 is brought into abutment on the inclined surface 2j. The other components are the same as those of the first embodiment.

As described above, according to the rotation sensor 1 of the fourth embodiment of the present invention, the case 2 includes the abutment surface 2h to be brought into abutment on the holder 13 in the depth direction B of the case 2, and the abutment surface 2h is arranged to be flush with the surface of the magnetic detection section 7 that is to be brought into abutment on the holder 13 in the depth direction B. Further, in the portion of the case 2 closer to the opening 2c than the abutment surface 2h, the inclined surface 2j is formed so that the dimension of the internal space of the case in the width direction A decreases as approaching to the bottom surface portion 2a in the depth direction B of the case 2. Still further, at least a part of the outer peripheral surface of the holder 13 is brought into abutment on the inclined surface 2j. Accordingly, the abutment surface 2h is brought into abutment on the holder lower surface, thereby being capable of reducing stress applied to the magnetic detection section 7 due to pressure of filling the exterior forming resin. Stress applied to the magnetic detection section 7 can be reduced. Accordingly, the manufacturing process can be stabilized, and quality can be stabilized.

Further, the holder 13 is press-fitted into the case 2 including the inclined surface 2j, thereby being capable of preventing the holder 13 from slipping off. Further, the holder 13 is press-fitted into the case 2, thereby being capable of preventing the magnetic detection section 7 from slipping off from the case 2 due to handling in the manufacturing steps. Therefore, simplification of the manufacturing steps can be achieved, and workability can be enhanced. In addition, the holder 13 is more closely fitted to the inner peripheral surface of the case 2. Accordingly, deformation in the η direction due to the pressure of filling the exterior forming resin can be prevented. As a result, a step of checking and inspecting an appearance of the case 2 can be omitted.

Fifth Embodiment

Figure 17:
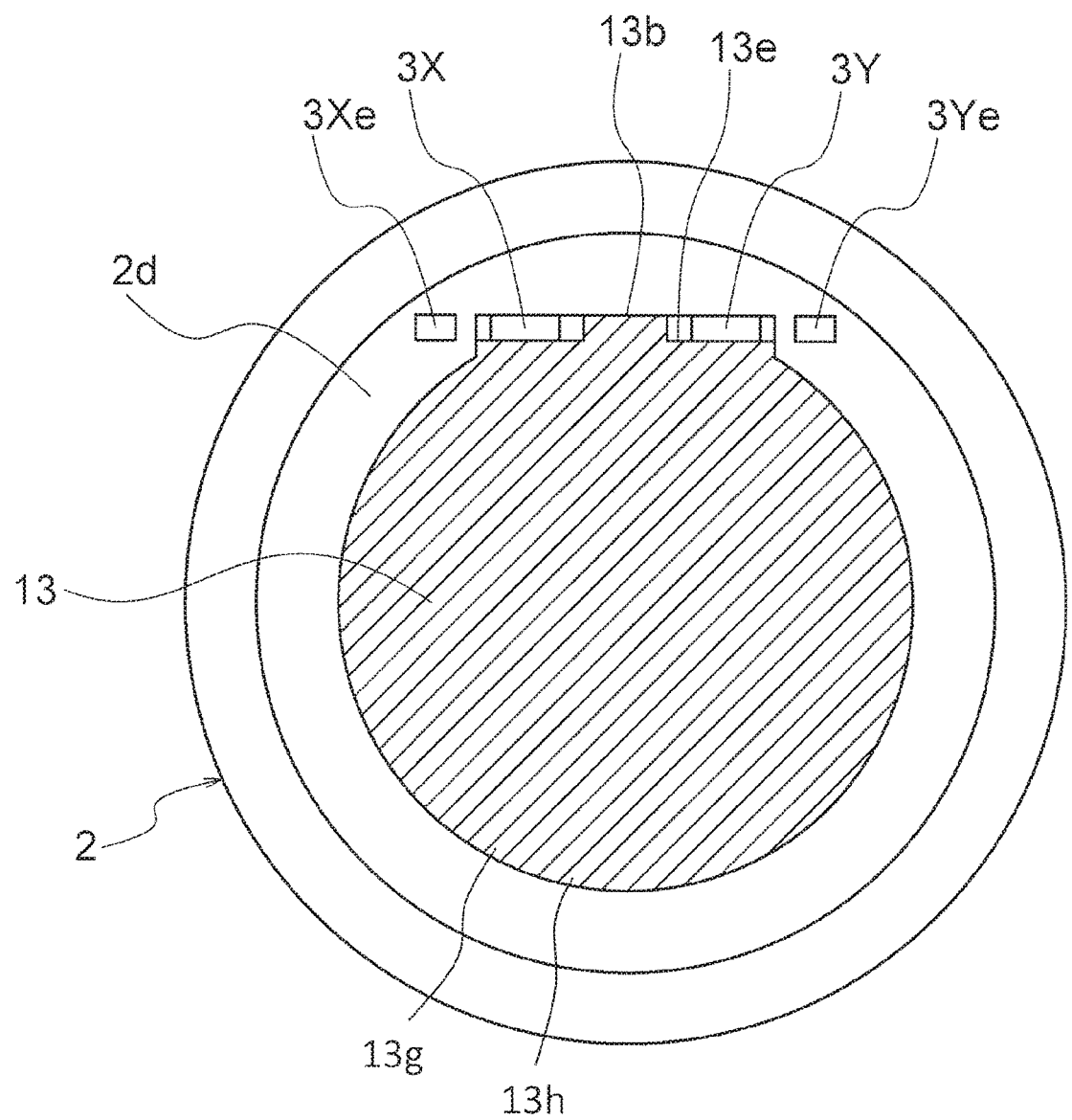
FIG. 17 is a sectional view for illustrating a rotation sensor according to a fifth embodiment of the present invention.

FIG. 17 is a sectional view for illustrating a rotation sensor according to a fifth embodiment of the present invention. The holder main body 13g of the holder 13 includes a body portion 13h having the outer peripheral surface 13e, and includes a protruding portion 13b protruding from the body portion in the width direction A of the internal space of the case 2. A dimension of the protruding portion 13b in a protruding direction thereof is approximately equal to a dimension of the lead frame 3X and a dimension of the lead frame 3Y in a thickness direction thereof. In other words, the dimension of the protruding portion 13b in a height direction thereof is approximately equal to the dimension of the lead frame 3X and the dimension of the lead frame 3Y in the thickness direction. The protruding portion 13b is arranged between the pair of lead frames 3X and 3Y. The other components are the same as those of the first embodiment.

As described above, according to the rotation sensor 1 of the fifth embodiment of the present invention, the holder main body 13g of the holder 13 includes the body portion 13h having the outer peripheral surface 13e, and includes the protruding portion 13b protruding from the body portion 13h in the width direction of the internal space of the case 2. Further, the protruding portion 13b is arranged between the pair of lead frames 3X and 3Y. Accordingly, the protruding portion 13b is interposed between the lead frame 3X and the lead frame 3Y adjacent to each other. Thus, the protruding portion 13b functions as a partition wall. As a result, deformation of the lead frame 3X and the lead frame 3Y due to handling in the manufacturing steps can be prevented, thereby being capable of enhancing workability.

Sixth Embodiment

Figure 18:
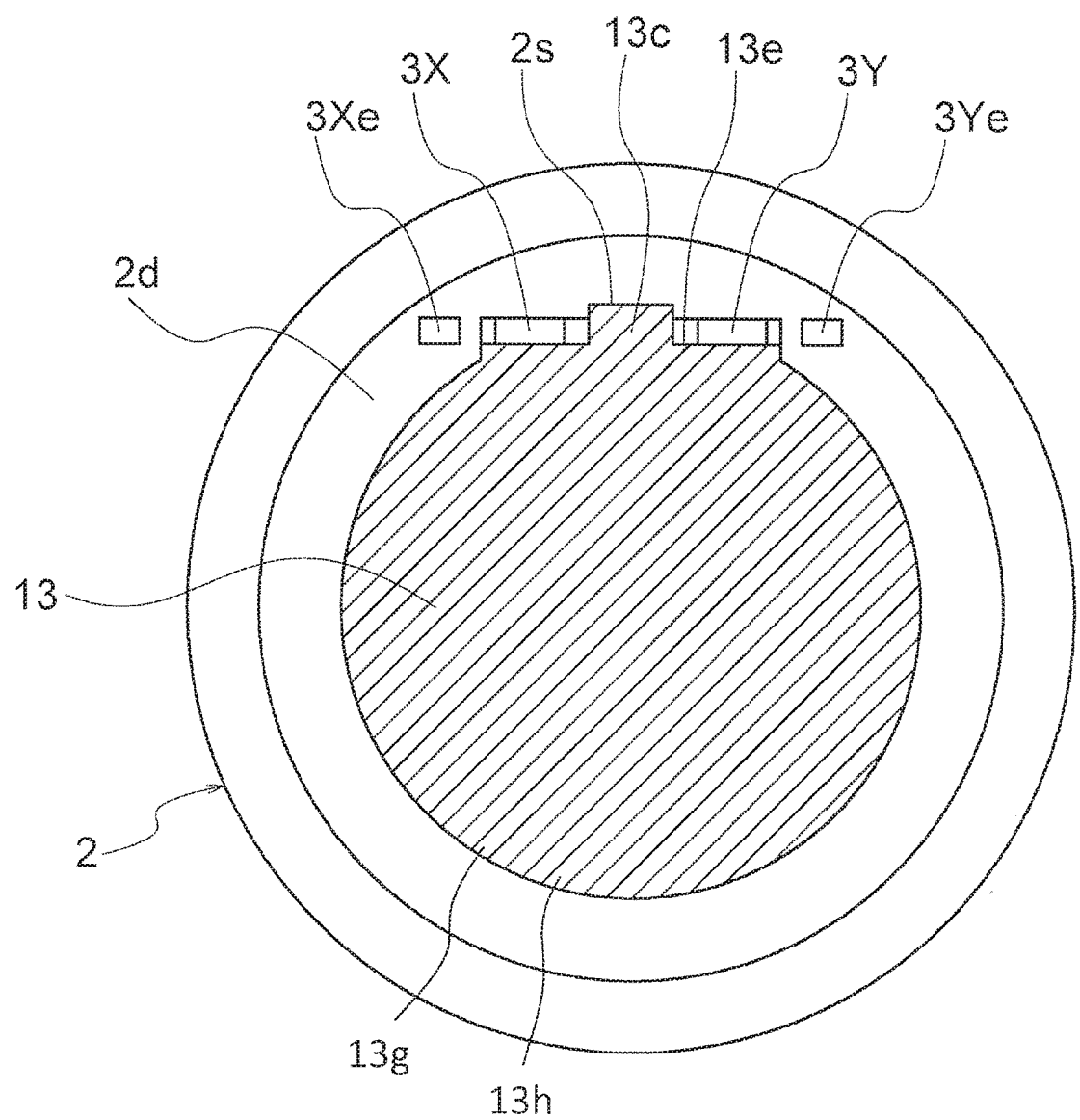
FIG. 18 is a sectional view for illustrating a rotation sensor according to a sixth embodiment of the present invention.

FIG. 18 is a sectional view for illustrating a rotation sensor according to a sixth embodiment of the present invention. The holder main body 13g of the holder 13 includes the body portion 13h having the outer peripheral surface 13e, and includes a protruding portion 13c protruding from the body portion in the width direction A of the internal space of the case 2. A dimension of the protruding portion 13c in a protruding direction thereof is larger than the dimension of the lead frame 3X and the dimension of the lead frame 3Y in the thickness direction. In other words, the dimension of the protruding portion 13c in a height direction is larger than the dimension of the lead frame 3X and the dimension of the lead frame 3Y in the thickness direction. The protruding portion 13c is arranged between the pair of lead frames 3X and 3Y. A groove 2s, into which the protruding portion 13c is to be fitted, is formed in a portion of the case 2 opposed to the protruding portion 13c. The other components are the same as those of the fifth embodiment.

As described above, according to the rotation sensor 1 of the sixth embodiment of the present invention, the groove 2s, into which the protruding portion 13c is to be fitted, is formed in the portion of the case 2 opposed to the protruding portion 13c. Accordingly, the holder 13 is inserted into the case 2 while the protruding portion 13c is fitted along the groove 2s, thereby being capable of enhancing ease of assembly and workability.

Seventh Embodiment

Figure 19:
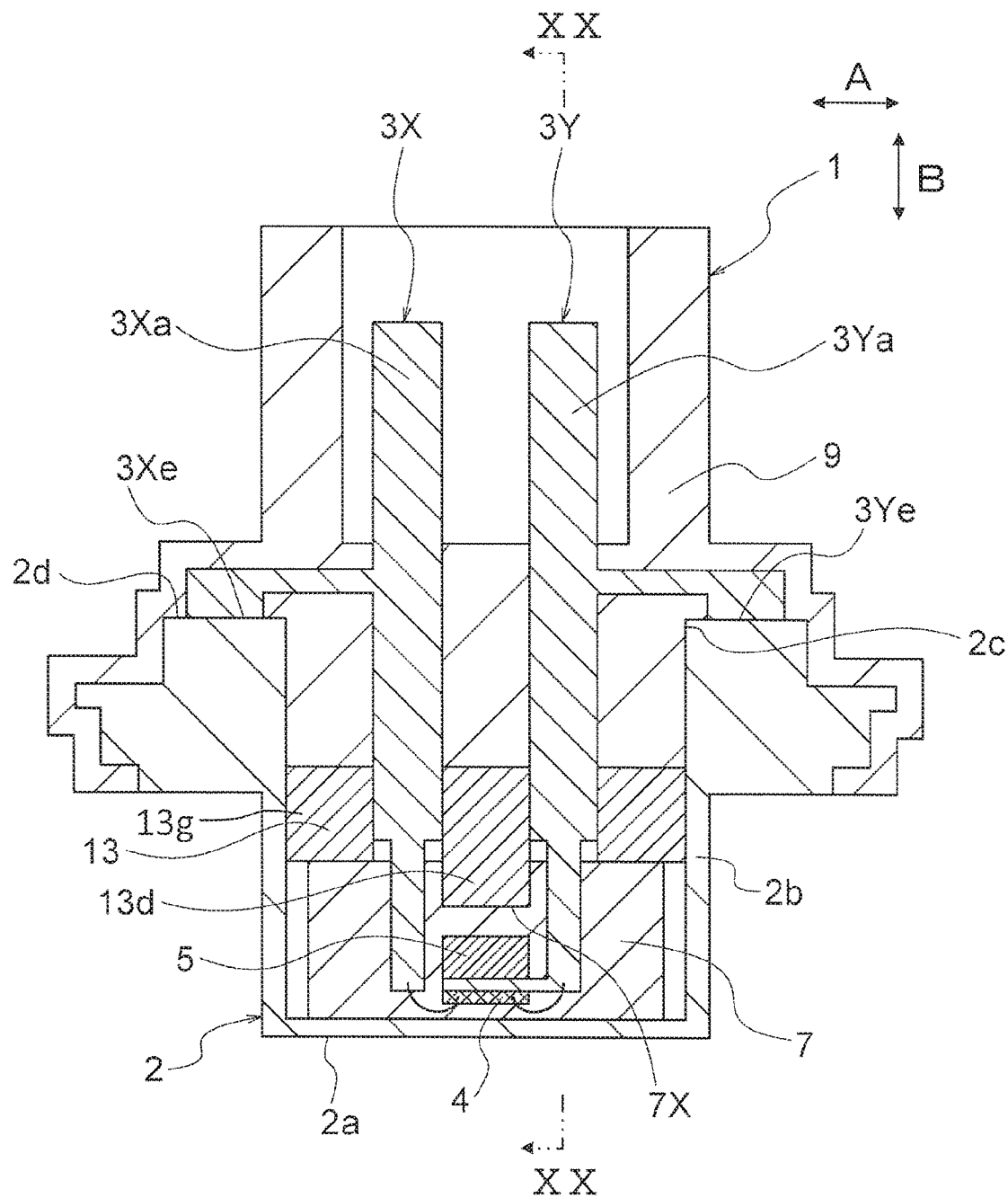
FIG. 19 is a sectional view for illustrating a rotation sensor according to a seventh embodiment of the present invention.
Figure 20:
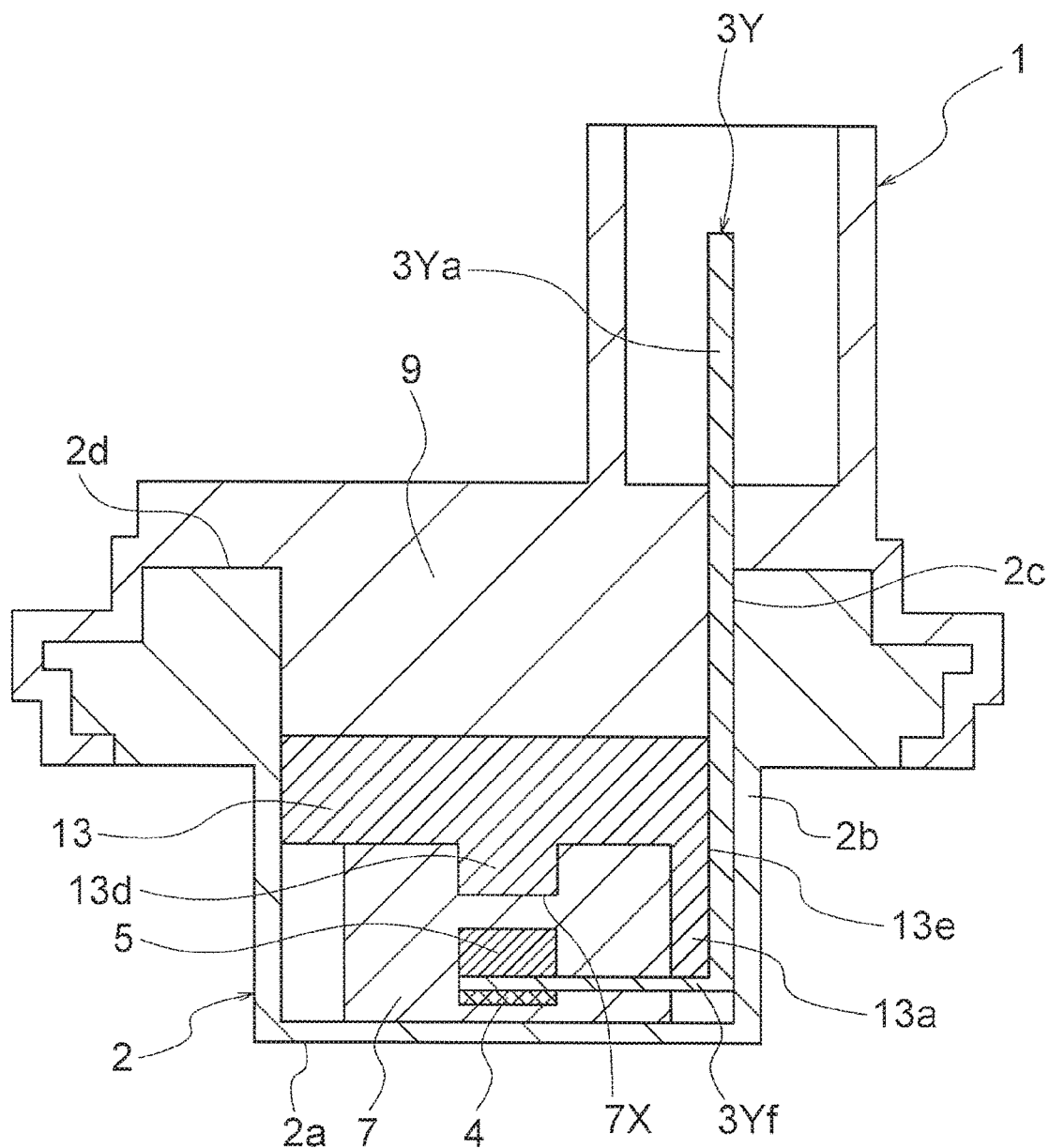
FIG. 20 is a sectional view taken along the line XX-XX of FIG. 19.

FIG. 19 is a sectional view for illustrating a rotation sensor according to a seventh embodiment of the present invention. FIG. 20 is a sectional view taken along the line XX-XX of FIG. 19. The rotation sensor 1 according to the seventh embodiment includes the fitting structure arranged between the holder 13 and the magnetic detection section 7 and configured to fit the holder 13 and the magnetic detection section 7 to each other.

In this embodiment, as the fitting structure, a convex fitting portion 13d extending in the depth direction B of the case 2 is formed on the holder main body 13g of the holder 13, and a concave fitting portion 7X, into which the convex fitting portion 13d is to be fitted, is formed in the magnetic detection section 7. The convex fitting portion may be formed on the magnetic detection section 7, and the concave fitting portion may be formed in the holder main body of the holder 13. The other components are the same as those of the first embodiment.

As described above, according to the rotation sensor 1 of the seventh embodiment of the present invention, the convex fitting portion 13d extending in the depth direction B of the case 2 is formed on the holder main body, and the concave fitting portion 7X, into which the convex fitting portion 13d is to be fitted, is formed in the magnetic detection section 7. Accordingly, the convex fitting portion 13d of the holder 13 is fitted into the concave fitting portion 7X of the magnetic detection section 7, thereby being capable of placing the magnetic detection section 7 with higher accuracy at a position preset in a radial direction of the case 2.

Eighth Embodiment

Figure 21:
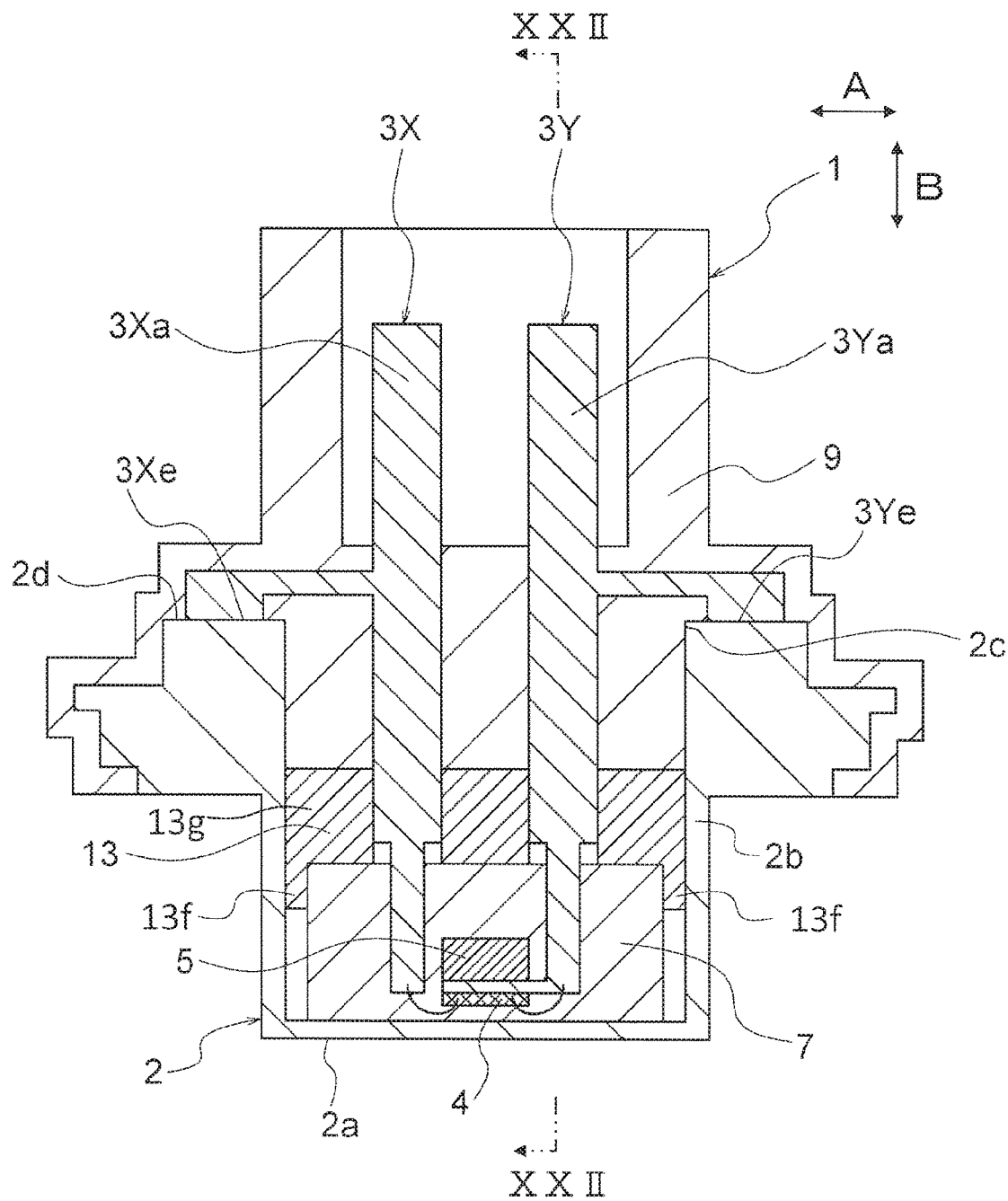
FIG. 21 is a sectional view for illustrating a rotation sensor according to an eighth embodiment of the present invention.
Figure 22:
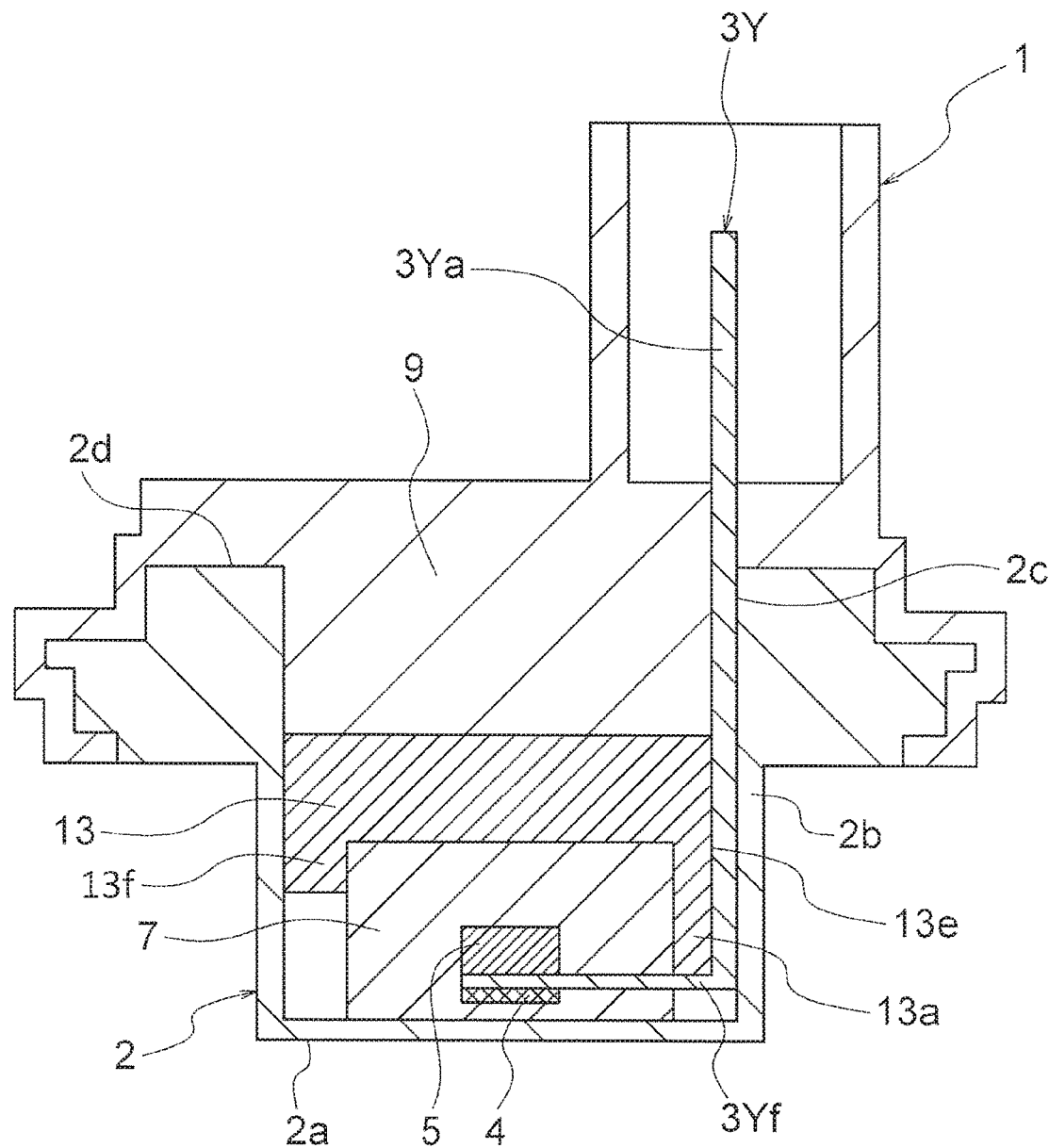
FIG. 22 is a sectional view taken along the line XXII-XXII of FIG. 21.

FIG. 21 is a sectional view for illustrating a rotation sensor according to an eighth embodiment of the present invention. FIG. 22 is a sectional view taken along the line XXII-XXII of FIG. 21. The rotation sensor 1 according to the eighth embodiment includes the fitting structure arranged between the holder 13 and the magnetic detection section 7 and configured to fit the holder 13 and the magnetic detection section 7 to each other.

In this embodiment, as the fitting structure, the holder 13 includes an annular rib 13f protruding from the holder main body 13g toward the bottom surface portion 2a. At least a part of an inner peripheral surface of the annular rib 13f is brought into abutment on an outer peripheral surface of the magnetic detection section 7. In other words, the inner peripheral surface of the annular rib 13f is formed into a shape extending along the outer peripheral surface of the magnetic detection section 7. The other components are the same as those of the first embodiment.

As described above, according to the rotation sensor 1 of the eighth embodiment of the present invention, the holder 13 includes the annular rib 13f protruding from the holder main body 13g toward the bottom surface portion 2a, and at least a part of the inner peripheral surface of the annular rib 13f is brought into abutment on the outer peripheral surface of the magnetic detection section 7. Accordingly, the annular rib 13f of the holder 13 is fitted onto the magnetic detection section 7, thereby being capable of placing the magnetic detection section 7 with higher accuracy at a position preset in the radial direction of the case 2.

Ninth Embodiment

Figure 23:
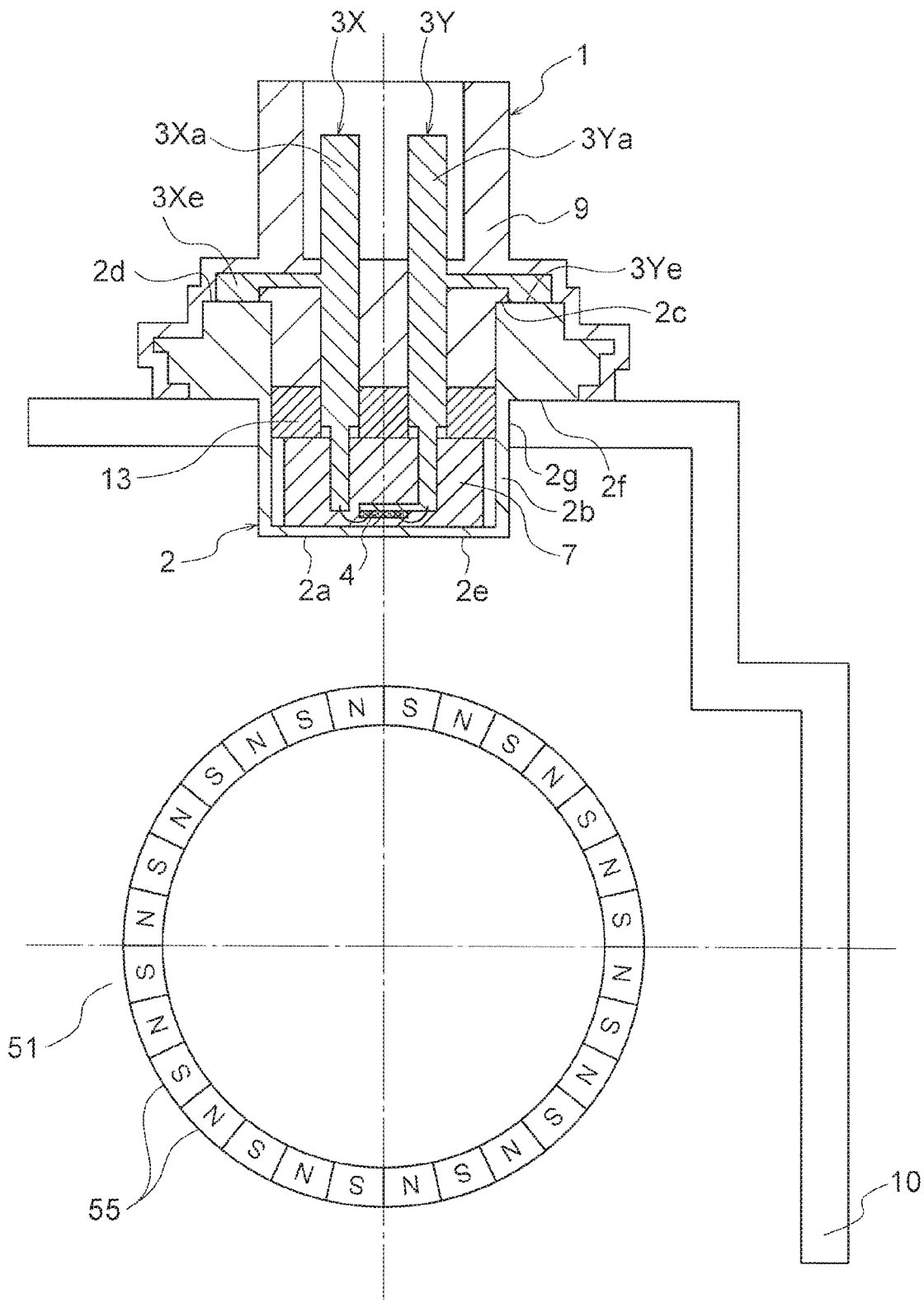
FIG. 23 is a sectional view for illustrating a rotation sensor according to a ninth embodiment of the present invention.

FIG. 23 is a sectional view for illustrating a rotation sensor according to a ninth embodiment of the present invention. In the first embodiment to the eighth embodiment, description is made of the configuration in which the detection element of the IC 4 detects the change in magnetic field of the in-sensor magnet 5 accommodated in the internal space of the case 2. In contrast to those embodiments, in the ninth embodiment, the in-sensor magnet 5 described in the first embodiment to the eighth embodiment is omitted, but the detection element of the IC 4 detects a change in magnetic field of a plurality of out-sensor magnets 55 arranged on an outer peripheral surface of a rotary shaft 51.

In the first embodiment to the eighth embodiment, the convex portions 12 are arranged on the rotary shaft 11 so that the rotary shaft 11 and the convex portions 12 define an entire outer peripheral surface having a concavo-convex shape or a gear shape. However, in the ninth embodiment, the rotary shaft 51 and the out-sensor magnets 55 define an entire outer peripheral surface having a circular cross-section.

The out-sensor magnets 55 are arranged so that surface polarities of the out-sensor magnets 55 alternate between a south pole and a north pole in a circumferential direction of the rotary shaft 51. The other components are the same as those of the first embodiment to the eighth embodiment. Further, manufacturing steps according to the ninth embodiment are the same as those of the first embodiment to the eighth embodiment. According to the rotation sensor 1 of the ninth embodiment of the present invention, the same effects as those of the rotation sensor 1 according to the first embodiment to the eighth embodiment can be obtained.

In FIG. 23, there is illustrated a mode of adding a feature of the invention according to the ninth embodiment to the rotation sensor 1 according to the first embodiment, but the present invention is not limited thereto. There may be adopted a mode of adding the feature of the invention according to the ninth embodiment to the rotation sensor 1 described in any one of the second embodiment to the eighth embodiment.

What is claimed is:

1. A rotation sensor, which is configured to detect rotation of a rotating body, the rotation sensor comprising:
a case comprising:
a bottom surface portion arranged at a distance from a surface of the rotating body;
a side surface portion defining a hollow internal space in cooperation with the bottom surface portion; and
an opening formed in a portion of the side surface portion opposite to the bottom surface portion so as to be spatially continuous with the hollow internal space;
a pair of lead frames each comprising a distal end inserted into the case through the opening;
a magnetic detection section arranged inside the case so as to extend over the distal end of each of the pair of lead frames, and configured to detect a change in magnetic field caused by a magnetic body arranged on the rotating body; and
a holder arranged in the case to surround the magnetic detection section in cooperation with the case,
the holder comprising:
a holder main body, which has an outer peripheral surface formed along an inner peripheral surface of the side surface portion and is configured to sandwich the pair of lead frames between the outer peripheral surface and the side surface portion such that the pair of lead frames directly contact the side surface portion; and
a rib formed along a forming portion of one of the pair of lead frames so as to be brought into contact with the forming portion.

2. A rotation sensor according to claim 1,
wherein the case comprises an abutment surface to be brought into abutment on the holder in a depth direction of the case, and
wherein the abutment surface is arranged to be flush with a surface of the magnetic detection section that is to be brought into abutment on the holder in the depth direction.

3. A rotation sensor, which is configured to detect rotation of a rotating body, the rotation sensor comprising:
a case comprising:
a bottom surface portion arranged at a distance from a surface of the rotating body;
a side surface portion defining a hollow internal space in cooperation with the bottom surface portion; and
an opening formed in a portion of the side surface portion opposite to the bottom surface portion so as to be spatially continuous with the hollow internal space;
a pair of lead frames each comprising a distal end inserted into the case through the opening;
a magnetic detection section arranged inside the case so as to extend over the distal end of each of the pair of lead frames, and configured to detect a chance in magnetic field caused by a magnetic body arranged on the rotating body; and
a holder arranged in the case to surround the magnetic detection section in cooperation with the case,
the holder comprising:
a holder main body, which has an outer peripheral surface formed along an inner peripheral surface of the side surface portion and is configured to sandwich the pair of lead frames between the outer peripheral surface and the side surface portion; and
a rib formed along a forming portion of one of the pair of lead frames so as to be brought into contact with the forming portion,
wherein the case comprises an inclined surface formed so that a dimension of the internal space in a width direction thereof decreases as approaching to the bottom surface portion in a depth direction of the case, and
wherein at least a part of the outer peripheral surface of the holder is brought into abutment on the inclined surface.

4. A rotation sensor, which is configured to detect rotation of a rotating body, the rotation sensor comprising:
a case comprising:
a bottom surface portion arranged at a distance from a surface of the rotating body;
a side surface portion defining a hollow internal space in cooperation with the bottom surface portion; and
an opening formed in a portion of the side surface portion opposite to the bottom surface portion so as to be spatially continuous with the hollow internal space;
a pair of lead frames each comprising a distal end inserted into the case through the opening;
a magnetic detection section arranged inside the case so as to extend over the distal end of each of the pair of lead frames, and configured to detect a change in magnetic field caused by a magnetic body arranged on the rotating body; and
a holder arranged in the case to surround the magnetic detection section in cooperation with the case,
the holder comprising:
a holder main body, which has an outer peripheral surface formed along an inner peripheral surface of the side surface portion and is configured to sandwich the pair of lead frames between the outer peripheral surface and the side surface portion; and
a rib formed along a forming portion of one of the pair of lead frames so as to be brought into contact with the forming portion,
wherein the case comprises an abutment surface to be brought into abutment on the holder in a depth direction of the case,
wherein the abutment surface is arranged to be flush with a surface of the magnetic detection section that is to be brought into abutment on the holder in the depth direction,
wherein, in a portion of the case closer to the opening than the abutment surface, an inclined surface is formed so that a dimension of the hollow internal space in a width direction thereof decreases as approaching to the bottom surface portion in the depth direction of the case, and
wherein at least a part of the outer peripheral surface of the holder is brought into abutment on the inclined surface.

5. A rotation sensor, which is configured to detect rotation of a rotating body, the rotation sensor comprising:
a case comprising:
a bottom surface portion arranged at a distance from a surface of the rotating body;
a side surface portion defining a hollow internal space in cooperation with the bottom surface portion; and
an opening formed in a portion of the side surface portion opposite to the bottom surface portion so as to be spatially continuous with the hollow internal space;

a pair of lead frames each comprising a distal end inserted into the case through the opening;

a magnetic detection section arranged inside the case so as to extend over the distal end of each of the pair of lead frames, and configured to detect a change in magnetic field caused by a magnetic body arranged on the rotating body; and a holder arranged in the case to surround the magnetic detection section in cooperation with the case, the holder comprising:

a holder main body, which has an outer peripheral surface formed along an inner peripheral surface of the side surface portion and is configured to sandwich the pair of lead frames between the outer peripheral surface and the side surface portion; and a rib formed along a forming portion of one of the pair of lead frames so as to be brought into contact with the forming portion, wherein the holder main body comprises a body portion having the outer peripheral surface, and comprises a protruding portion protruding from the body portion in a width direction of the hollow internal space, and wherein the protruding portion is arranged between the pair of lead frames.

6. A rotation sensor according to claim 5, wherein a groove, into which the protruding portion is to be fitted, is formed in a portion of the case opposed to the protruding portion.

7. A rotation sensor according to claim 1, wherein a convex fitting portion extending in a depth direction of the case is formed on any one of the holder main body and the magnetic detection section, and wherein a concave fitting portion, into which the convex fitting portion is to be fitted, is formed in another one of the holder main body and the magnetic detection section.

8. A rotation sensor according to claim 1, wherein the holder further comprises an annular rib protruding from the holder main body toward the bottom surface portion, and wherein at least a part of an inner peripheral surface of the annular rib is brought into abutment on an outer peripheral surface of the magnetic detection section.

* * * * *